US012766570B2

(12) United States Patent
Kitamori et al.

(10) Patent No.: US 12,766,570 B2
(45) Date of Patent: Oct. 20, 2026

(54) VIBRATION DEVICE AND IMAGING DEVICE

(71) Applicant: Murata Manufacturing Co., Ltd., Nagaokakyo (JP)

(72) Inventors: Nobumasa Kitamori, Nagaokakyo (JP); Yuuki Ishii, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 302 days.

(21) Appl. No.: 18/760,868

(22) Filed: Jul. 1, 2024

(65) Prior Publication Data

US 2024/0351076 A1 Oct. 24, 2024

Related U.S. Application Data

(63) Continuation of application No. PCT/JP2022/037211, filed on Oct. 5, 2022.

(30) Foreign Application Priority Data

Feb. 10, 2022 (JP) ................................ 2022-019907

(51) Int. Cl.
*B08B 7/02* (2006.01)
*G02B 27/00* (2006.01)

(52) U.S. Cl.
CPC ............ *B08B 7/02* (2013.01); *G02B 27/0006* (2013.01)

(58) Field of Classification Search
CPC .............................. B08B 7/02; G02B 27/0006
See application file for complete search history.

(56) References Cited

U.S. PATENT DOCUMENTS

| | | | |
|---|---|---|---|
| 2014/0036084 A1 | 2/2014 | Lu | |
| 2020/0225466 A1 | 7/2020 | Sakaguchi et al. | |
| 2020/0284741 A1 | 9/2020 | Magee et al. | |
| 2021/0325667 A1 | 10/2021 | Nakadoi | |

FOREIGN PATENT DOCUMENTS

| | | | | |
|---|---|---|---|---|
| GB | 1032775 A | * | 6/1966 | ............... G21D 7/04 |
| JP | 2017170303 A | * | 9/2017 | ............. H04N 23/51 |
| WO | 2019130629 A1 | | 7/2019 | |
| WO | 2020003574 A1 | | 1/2020 | |
| WO | 2021210208 A1 | | 10/2021 | |

OTHER PUBLICATIONS

International Search Report in PCT/JP2022/037211, mailed Dec. 20, 2022, 3 pages.
Written Opinion in PCT/JP2022/037211, mailed Dec. 20, 2022, 3 pages.

* cited by examiner

*Primary Examiner* — Lucy P Chien
(74) *Attorney, Agent, or Firm* — Keating & Bennett, LLP

(57) ABSTRACT

A vibration device includes a light transmitter, a vibrator to support the light transmitter, a piezoelectric body located on or in the vibrator to vibrate the vibrator, and a first metal structure located, in a compressed state, between the light transmitter and a support that supports the light transmitter, and having a smaller Young's modulus than the light transmitter and the support that supports the light transmitter.

20 Claims, 30 Drawing Sheets

VIBRATION DEVICE AND IMAGING DEVICE

CROSS REFERENCE TO RELATED APPLICATIONS

This application claims the benefit of priority to Japanese Patent Application No. 2022-019907 filed on Feb. 10, 2022 and is a Continuation Application of PCT Application No. PCT/JP2022/037211 filed on Oct. 5, 2022. The entire contents of each application are hereby incorporated herein by reference.

BACKGROUND OF THE INVENTION

1. Field of the Invention

The present disclosure relates to vibration devices and imaging devices.

2. Description of the Related Art

A device for removing liquid droplets or the like attached to a light transmitter covering an imager is known.

For example, Japanese Unexamined Patent Application Publication No. 2017-170303 discloses a liquid-droplet removal device including a liquid-proof seal that prevents liquid droplets from entering the inside of the device.

SUMMARY OF THE INVENTION

However, the device described in Japanese Unexamined Patent Application Publication No. 2017-170303 still has room for improvement in terms of reducing damping of vibration while preventing liquid droplets from entering the device.

Hence, example embodiments of the present invention provide vibration devices and imaging devices in each of which, damping of vibration is reduced while liquid droplets are prevented from entering the device.

A vibration device according to an example embodiment of the present disclosure includes a light transmitter, a vibrator to support the light transmitter, a piezoelectric body located on or in the vibrator to vibrate the vibrator, and a first metal structure located, in a compressed state, between the light transmitter and a support that supports the light transmitter, and having a smaller Young's modulus than the light transmitter and the support that supports the light transmitter.

An imaging device according to an example embodiment of the present disclosure includes the vibration device according to another example embodiment of the present disclosure, and an imager located in the vibration device.

With the vibration devices according to example embodiments of the present disclosure, it is possible to reduce damping of vibration while preventing liquid droplets from entering the devices.

In the imaging devices according to example embodiments of the present disclosure, damping of vibration is reduced while liquid droplets are prevented from entering the devices.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
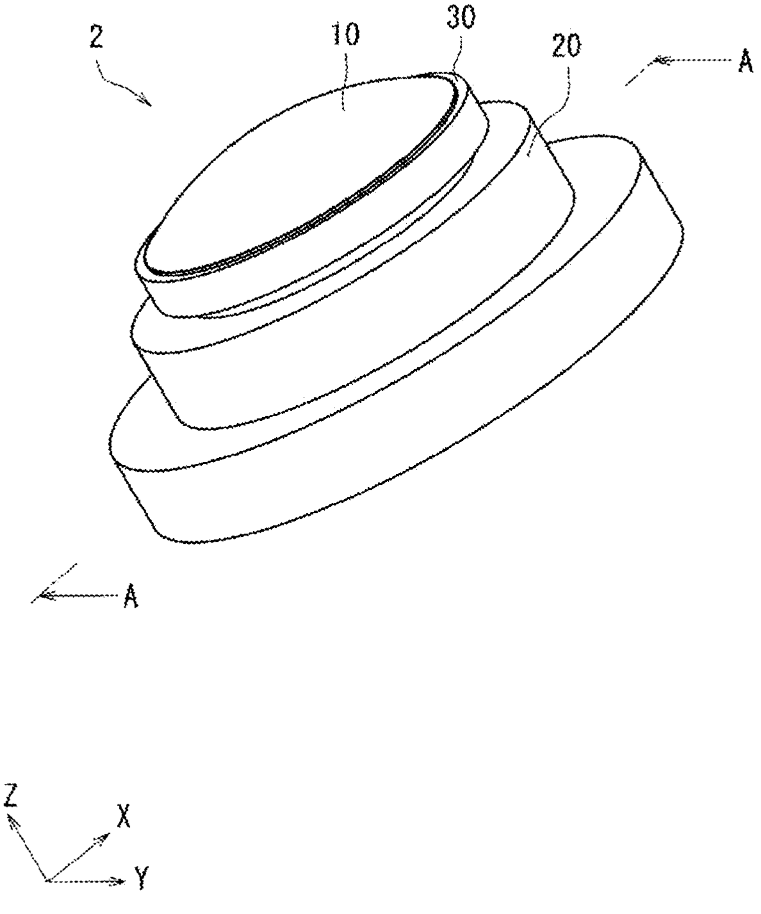
FIG. 1 is a perspective view of a vibration device according to Example Embodiment 1 of the present invention.

Since cameras used outdoors such as on-vehicle cameras, surveillance cameras, and the like, or cameras mounted on drones, and the like are exposed to wind and rain, such cameras have covers covering lenses and formed of glass, transparent plastic, or the like. If foreign matter such as mud or oil is attached to the cover, the foreign matter is taken in the images captured by the camera and blocks the field of view of the camera, and clear images sometimes cannot be obtained.

Hence, a device as in the liquid-droplet removal device disclosed in Japanese Unexamined Patent Application Publication No. 2017-170303 is being studied for removing liquid droplets or the like attached to a liquid-proof cover by causing the liquid-proof cover to perform bending vibration by using a piezoelectric member provided for the liquid-proof cover to break up the droplets or the like.

In the liquid-droplet removal device disclosed in Japanese Unexamined Patent Application Publication No. 2017-170303, a flange portion of the liquid-proof cover and the piezoelectric member are fixed to each other with an adhesive, and a liquid-proof seal having a circular loop shape extending along the entire outer peripheral edge portion of the flange portion is in close contact with and fitted to the flange portion.

However, in the device disclosed in Japanese Unexamined Patent Application Publication No. 2017-170303, the liquid-proof seal is formed of a rubber material and has a property to absorb vibration. Hence, there is a problem that when vibration of the piezoelectric member is transmitted to the liquid-proof cover, the liquid-proof seal causes vibration loss.

To solve the problem, the inventor conceived the configurations of vibration devices and imaging devices according to example embodiments of the present disclosure.

A vibration device according to a example embodiment of the present disclosure includes a light transmitter, a vibrator to support the light transmitter, a piezoelectric body located on or in the vibrator to vibrate the vibrator, and a first metal structure located, in a compressed state, between the light transmitter and a support that supports the light transmitter, and having a smaller Young's modulus than the light transmitter and the support that supports the light transmitter.

The configuration mentioned above makes it possible to reduce damping of vibration while preventing liquid droplets from entering the device.

In a vibration device according to a second example embodiment of the present disclosure, the support that supports the light transmitter may include the vibrator, and the first metal structure may be located between the light transmitter and the vibrator.

The configuration mentioned above makes it possible to reduce damping of vibration while preventing liquid droplets from entering the device.

In a vibration device according to a third example embodiment of the present disclosure, the light transmitter may include a first surface and a second surface on a side opposite to the first surface, the vibrator may include a hollow cylindrical body portion and a support portion located at one end of the body portion and including a support surface that supports the second surface of the light transmitter, and the first metal structure may be located between the second surface of the light transmitter and the support surface of the support portion.

The configuration mentioned above makes it possible to reduce damping of vibration while preventing liquid droplets from entering the device.

In a vibration device according to a fourth example embodiment of the present disclosure, the light transmitter may include a first surface, a second surface on a side opposite to the first surface, and a third surface connecting the first surface and the second surface, the vibrator may include a hollow cylindrical body portion, a support portion located at one end of the body portion, and a rib protruding from the support portion in a direction in which the light transmitter is located, the rib may include a rib inner peripheral surface that faces the third surface of the light transmitter, and the first metal structure may be located between the third surface of the light transmitter and the rib inner peripheral surface of the rib.

The configuration mentioned above makes it possible to reduce damping of vibration while preventing liquid droplets from entering the device.

A vibration device according to a fifth example embodiment of the present disclosure may further include a holder attached to the vibrator to press the light transmitter toward the vibrator.

The configuration mentioned above makes it possible to keep the metal structure compressed, prevent liquid droplets from entering the device, and also reduce damping of vibration.

In a vibration device according to a sixth example embodiment of the present disclosure, the support that supports the light transmitter may include the holder, and the first metal structure may be located between the light transmitter and the holder.

The configuration mentioned above makes it possible to reduce damping of vibration while preventing liquid droplets from entering the device.

In a vibration device according to a seventh example embodiment of the present disclosure, the light transmitter may include a first surface and a second surface on a side opposite to the first surface, the vibrator may include a hollow cylindrical body portion and a support portion located at one end of the body portion and including a support surface that supports the second surface of the light transmitter, the holder may include a pressing surface that supports the first surface of the light transmitter, and the first metal structure may be located between the first surface of the light transmitter and the pressing surface of the holder.

The configuration mentioned above makes it possible to reduce damping of vibration while preventing liquid droplets from entering the device.

In a vibration device according to an eighth example embodiment of the present disclosure, the light transmitter may include a first surface, a second surface on a side opposite to the first surface, and a third surface connecting the first surface and the second surface, the holder may include a pressing surface that supports the first surface of the light transmitter and an inner side surface that faces the third surface of the light transmitter, and the first metal structure may be located between the third surface of the light transmitter and the inner side surface of the holder.

The configuration mentioned above makes it possible to reduce damping of vibration while preventing liquid droplets from entering the device.

In a vibration device according to a ninth example embodiment of the present disclosure, the first metal structure may include an inclined surface on a side of which the third surface of the light transmitter is located.

The configuration mentioned above makes it possible to reduce damping of vibration while preventing liquid droplets from entering the device.

A vibration device according to a tenth example embodiment of the present disclosure may further include a second metal structure located, in the compressed state, between the vibrator and the holder and having a smaller Young's modulus than the vibrator and the holder.

The configuration mentioned above makes it possible to prevent liquid droplets from entering the device.

A vibration device according to an eleventh example embodiment of the present disclosure may further include an adhesive provided between the light transmitter and the support that supports the light transmitter, except a portion where the first metal structure is located.

The configuration mentioned above makes it possible to reduce damping of vibration while preventing liquid droplets from entering the device.

In a vibration device according to a twelfth example embodiment of the present disclosure, the support that supports the light transmitter may include at least one of a protrusion or a recess located between the adhesive and the first metal structure to separate the adhesive from the first metal structure.

The configuration mentioned above makes it possible to reduce damping of vibration while preventing liquid droplets from entering the device.

In a vibration device according to a thirteenth example embodiment of the present disclosure, the adhesive may be an epoxy-based resin.

The configuration mentioned above makes it possible to improve the vibration efficiency of the light transmitter. This in turn reduces damping of vibration.

In a vibration device according to a fourteenth example embodiment of the present disclosure, the first metal structure may include a metal film provided on a portion of the vibrator supporting the light transmitter.

The configuration mentioned above makes it possible to save the production cost. In addition, this configuration makes it possible to improve the adhesion between the support that supports the light transmitter and the first metal structure and thereby reduce damping of vibration.

An imaging device according to a fifteenth example embodiment of the present disclosure includes the vibration device according to any one of the first to fourteenth example embodiments of the present disclosure, and an imager located in the vibration device.

The configuration mentioned above makes it possible to reduce damping of vibration while preventing liquid droplets from entering the device. In addition, this configuration prevents the field of view of the imager from being blocked by foreign matter in imaging devices used under conditions of being exposed to wind and rain.

Hereinafter, example embodiments of the present disclosure will be described with reference to the accompanying drawings. In each figure, illustration of each element is exaggerated for convenience of explanation.

In this specification, terms such as "first" and "second" are used only for the purpose of explanation. Hence, it should not be understood that these terms specify or imply the order of relative importance or technical features. A feature limited as a "first" one or a "second" one specifies or implies that the feature includes one or more of the same features. In the accompanying drawing, the X, Y, and Z directions in the figures correspond to the lateral direction, longitudinal direction, and thickness direction of the vibration device and the imaging device, respectively.

Example Embodiment 1

Overall Configuration

Figure 2:
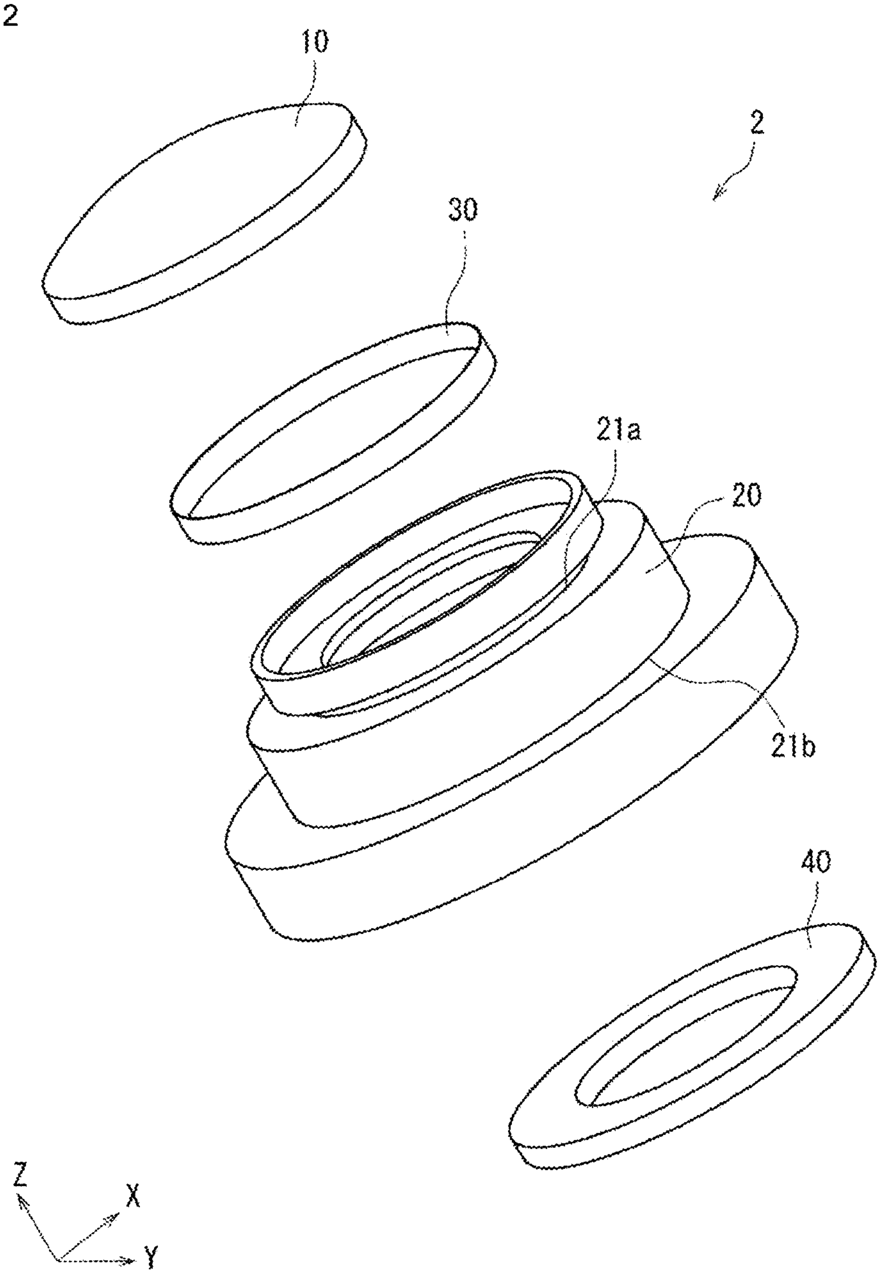
FIG. 2 is an exploded perspective view of the vibration device in FIG. 1.
Figure 3A:
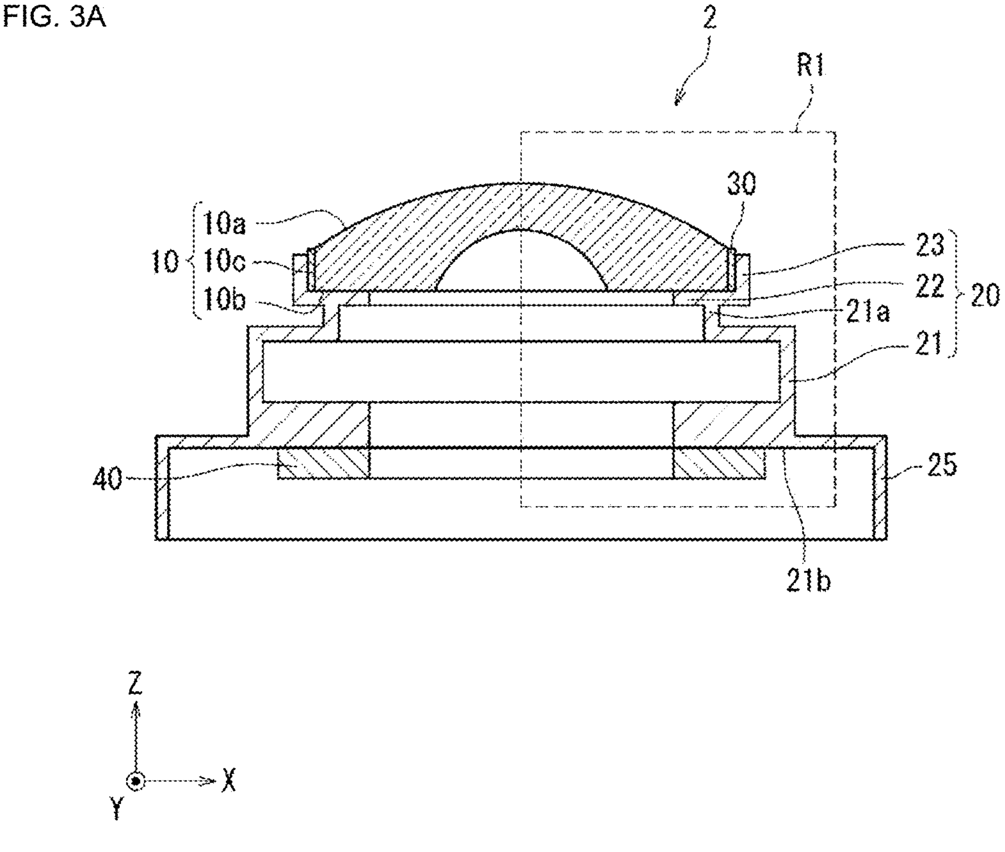
FIG. 3A is a cross-sectional view of the vibration device in FIG. 1 taken along line A-A.
Figure 3B:
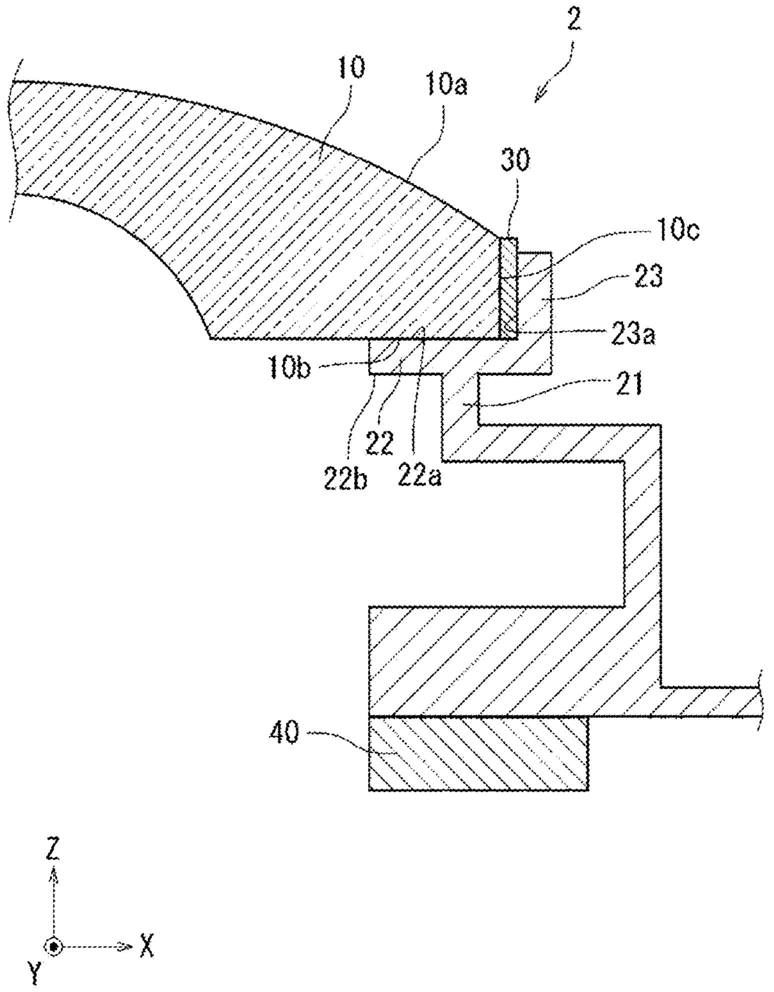
FIG. 3B is an enlarged partial cross-sectional view of a region R1 in FIG. 3A.
Figure 4:
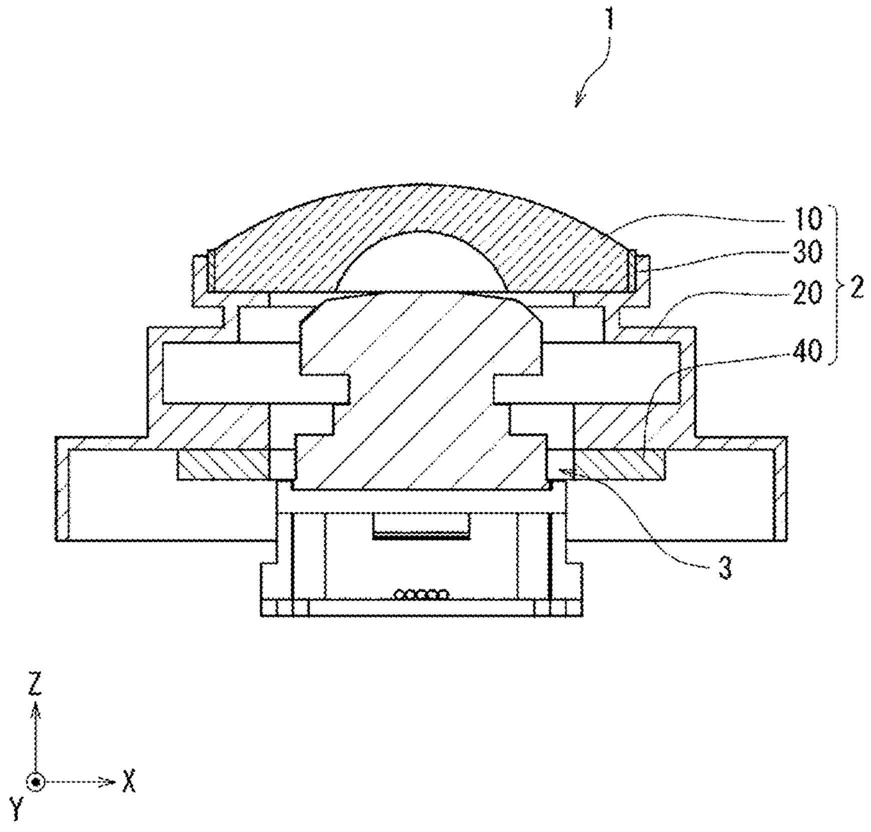
FIG. 4 is a cross-sectional view of an imaging device including the vibration device in FIG. 1.

FIG. 1 is a perspective view of a vibration device according to Example Embodiment 1. FIG. 2 is an exploded perspective view of the vibration device in FIG. 1. FIG. 3A is a cross-sectional view of the vibration device in FIG. 1. FIG. 3B is an enlarged partial cross-sectional view of a region R1 in FIG. 3A. FIG. 4 is a cross-sectional view of an imaging device including the vibration device in FIG. 1.

As illustrated in FIGS. 1 and 2, the vibration device 2 includes a light transmitter 10, a vibrator 20, a metal structure 30, and a piezoelectric body 40. In the vibration device 2 in the present example embodiment, vibration of the piezoelectric body 40 located on or in the vibrator 20 is transmitted to the light transmitter 10 through the vibrator 20 to vibrate the light transmitter 10 to remove water droplets or the like attached to the light transmitter 10. The metal structure 30 is located between the light transmitter 10 and the support that supports the light transmitter 10 in the compressed state. Thus, the metal structure 30 prevents liquid droplets from entering the inside of the vibration device 2 and also reduces absorption of the vibration transmitted from the vibrator 20 to the light transmitter 10. In the present example embodiment, the support that supports the light transmitter 10 is the vibrator 20. In the present example embodiment, the vibration device 2 includes conductors (not illustrated) for applying electric potentials to the piezoelectric body 40.

The vibration device 2 is used in, for example, an imaging device. As illustrated in FIG. 4, the imaging device 1 includes the vibration device 2 and an imaging unit 3. The imaging unit 3 is located inside the vibration device 2. The imaging unit 3 includes, for example, an optical element, an imager, a sensor component, and the like and includes a case component housing these. The imaging unit 3 is configured to capture images of imaging target objects outside the vibration device 2 through the light transmitter 10 of the vibration device 2.

Each element of the vibration device 2 according to Example Embodiment 1 will be described in detail below.

Light Transmitter

As illustrated in FIG. 4, the light transmitter 10 is a cover to prevent foreign matter from being attached to the lens of the imaging unit 3 in the configuration in which the imaging unit 3 is located inside the vibration device 2. The light transmitter 10 has a light transmission property that allows energy rays or light with wavelengths detected by the imaging unit 3 to pass through. The light transmitter 10 may include a lens having a light-gathering ability.

As illustrated in FIGS. 3A and 3B, the light transmitter 10 includes a first surface 10*a*, a second surface 10*b* on the side opposite to the first surface 10*a*, and a third surface 10*c* connecting the first surface 10*a* and the second surface 10*b*.

The first surface 10*a* is, for example, curved so as to protrude from the inside to the outside of the light transmitter 10. The first surface 10*a* in the present example embodiment is roundly curved.

The second surface 10*b* has, for example, a flat surface at the outer periphery continuous with the third surface 10*c* and a curved surface in the center portion, protruding from the outside to the inside of the light transmitter 10. In other words, the second surface 10*b* is a concave curved surface recessed in the thickness direction Z of the light transmitter 10.

The third surface 10*c* may be a flat surface extending in the thickness direction Z of the light transmitter 10 or a stepped surface.

As illustrated in FIG. 2, the light transmitter 10 in the present example embodiment has a dome shape. Specifically, the light transmitter 10 is circular when viewed in the thickness direction Z.

The first surface 10*a*, the second surface 10*b*, and the third surface 10*c* of the light transmitter 10 may include a coating such as an AR coating, a water-repellent coating, or an impact resistant coating, as necessary.

As illustrated in FIG. 3B, the light transmitter 10 is supported by the vibrator 20. In the present example embodiment, the second surface 10*b* and the third surface 10*c* of the light transmitter 10 are supported by the vibrator 20.

Examples of materials that can be used for the light transmitter 10 include glasses such as soda-lime glass, borosilicate glass, aluminosilicate glass, and quartz glass; plastics having a light transmission property; ceramics having a light transmission property; and synthetic resins. In the case in which the light transmitter 10 is formed of, for example, a toughened glass strengthened by chemical strengthening or the like, the light transmitter 10 can have a higher strength.

Vibrator

As illustrated in FIG. 3A, the vibrator 20 is the support that supports the light transmitter 10. The vibrator 20 is located on the second surface 10*b* side of the light transmitter 10.

The vibrator 20 includes a hollow cylindrical body portion 21, a support portion 22 located at one end 21*a* of the body portion 21, and a rib 23 protruding from the support portion 22 in the direction to the side on which the light transmitter 10 is located. The vibrator 20 further includes a fixation portion 25 with which the body portion 21 is fixed.

As illustrated in FIG. 2, the body portion 21 includes the one end 21*a* which is on the side where the light transmitter 10 is located and the other end 21*b* on the side opposite to the one end 21*a*.

As illustrated in FIG. 3B, the support portion 22 is a plate-shaped structure located at the one end 21*a* of the body portion 21. The support portion 22 is continuous with the one end 21*a* of the body portion 21. In other words, the support portion 22 has a unitary structure with the body portion 21. The support portion 22 has, for example, a loop shape extending along the one end 21*a* of the body portion 21 when viewed in the thickness direction Z. The support portion 22 has, for example, a circular loop shape when viewed in the thickness direction Z. Specifically, the support portion 22 is a flange protruding inward and outward from the body portion 21 when viewed in the thickness direction Z. Note that the flange may protrude only outward from the body portion 21 without protruding inward or may protrude only inward from the body portion 21 without protruding outward.

The support portion 22 may include a support surface 22*a* that supports the second surface 10*b* of the light transmitter 10. The support surface 22*a* is, for example, flat.

As illustrated in FIG. 3B, the rib 23 protrudes from the support portion 22 to the side on which the light transmitter 10 is located. The rib 23 extends in the thickness direction Z. The rib 23 has a loop shape extending along the third surface 10*c* of the light transmitter 10 when viewed in the thickness direction Z. The rib 23 has, for example, a circular loop shape when viewed in the thickness direction Z. The rib 23 includes a rib inner peripheral surface 23*a* that faces the third surface 10*c* of the light transmitter 10.

As illustrated in FIG. 3B, the light transmitter 10 in the present example embodiment is supported by the support portion 22 and the rib 23. Specifically, the support surface 22*a* of the support portion 22 supports the second surface 10*b* of the light transmitter 10, and the rib inner peripheral surface 23*a* of the rib 23 supports the third surface 10*c* of the light transmitter 10.

The vibrator 20 receives vibration of the piezoelectric body 40 described later and vibrates the light transmitter 10. For the material of the vibrator 20, a ceramic, or a metal such as stainless steel, aluminum, iron, titanium, or duralumin can be used. To reduce the loss of the vibration transmitted from the piezoelectric body 40 to the light transmitter 10, it is desirable that the vibrator 20 be formed of a high stiffness material.

Metal Structure

The metal structure 30 is located, in the compressed state, between the light transmitter 10 and the support that supports the light transmitter 10. As illustrated in FIG. 3B, the metal structure 30 in the present example embodiment is located between the light transmitter 10 and the vibrator 20. In other words, the support that supports the light transmitter 10 refers to the vibrator 20. The metal structure 30 is compressed by the light transmitter 10 and the vibrator 20. The metal structure 30 is located, in the compressed state, for example, between the rib inner peripheral surface 23*a* of the rib 23 and the third surface 10*c* of the light transmitter 10. Examples of the state of being compressed include the state of being pressed by and between the light transmitter 10 and the vibrator 20. The state of being compressed denotes the state in which the metal structure 30 is pressed by and between the light transmitter 10 and the rib 23 of the vibrator 20 and thereby deformed and distorted. This configuration causes the metal structure 30 to be in close contact with the third surface 10*c* of the light transmitter 10 and the rib inner peripheral surface 23*a* of the rib 23. This enables the gap between the third surface 10*c* of the light transmitter 10 and the rib inner peripheral surface 23*a* of the rib 23 to be sealed.

The metal structure 30 is a loop-shaped structure when viewed in the thickness direction Z. As illustrated in FIG. 2, the metal structure 30 extends along the entire rib inner peripheral surface 23*a* and the entire circumferential third surface 10*c*. The metal structure 30 has, for example, a circular loop shape when viewed in the thickness direction Z. The distance between the inner periphery and the outer periphery of the metal structure 30, in other words, the thickness of the metal structure 30, is, for example, about 5 μm or more and about 2 mm or less. It is preferable that the thickness of the metal structure 30 be about 10 μm or more and about 1 mm or less, for example.

The metal structure 30 has a smaller Young's modulus than the light transmitter 10 and the vibrator 20. The Young's modulus of the metal structure 30 is, for example, about 30 MPa or more and about 170 MPa or less. It is preferable that the Young's modulus of the metal structure 30 be about 50 MPa or more and about 150 MPa or less, for example.

The material of the metal structure 30 is, for example, copper (the Young's modulus of which is about 123 MPa).

Piezoelectric Body

As illustrated in FIG. 3B, the piezoelectric body 40 is fixed to the vibrator 20. The piezoelectric body 40 is, for example, fixed to the vibrator 20 with an adhesive. The piezoelectric body 40, for example, vibrates when a voltage is applied.

Although the piezoelectric body 40 is located away from the support portion 22 of the vibrator 20 in the example illustrated in FIG. 3B, the piezoelectric body 40 may be located at the support portion 22. Specifically, the piezoelectric body 40 may be located, for example, on the surface 22*b* opposite to the support surface 22*a* of the support portion 22.

The piezoelectric body 40 in the present example embodiment has a circular loop plate shape when viewed in the thickness direction Z. The shape of the piezoelectric body 40 is not limited to a circular loop plate shape and may be any shape that can vibrate the vibrator 20.

Examples of materials that can be used to form the piezoelectric body 40 include appropriate piezoelectric ceramics such as barium titanate ($BaTiO_3$), lead titanate/lead zirconate (PZT: $PbTiO_3 \cdot PbZro_3$), lead titanate ($PbTiO_3$), lead metaniobate ($PbNb_2O_6$), bismuth titanate ($Bi_4Ti_3O_{12}$), and $(K,Na)NbO_3$; and appropriate piezoelectric single crystals such as $LiTaO_3$ and $LiNbO_3$.

The piezoelectric body 40 includes conductors to apply a voltage to the piezoelectric body 40. The conductors are provided, for example, on a surface of the piezoelectric body 40 by vapor deposition. Examples of materials that can be used for the conductors include a metal having a high conductivity such as stainless steel, silver, and copper. Alternatively, the conductors may be wiring formed on a flexible printed circuit (FPC). The FPC may be a polyimide substrate on which wiring is formed with copper foil. In the case in which the conductors are on an FPC, a voltage can be applied to the piezoelectric body 40 without impeding vibration because the conductors are flexible.

Advantageous Effects

In the vibration device 2 having the configuration described above, the metal structure 30, having a smaller Young's modulus than the light transmitter 10 and the vibrator 20 that supports the light transmitter 10, is located between the light transmitter 10 and the vibrator 20 in the compressed state. This configuration makes it possible to provide the metal structure 30 that seals the gap between the light transmitter 10 and the vibrator 20, without damaging the light transmitter 10 and the vibrator 20, and thereby to prevent liquid droplets from entering the vibration device 2. The vibration device 2 having the configuration described above makes it possible to prevent the vibration transmitted to the light transmitter 10 through the vibrator 20 from being absorbed by the metal structure 30, as compared with that in cases in which a liquid-proof seal including silicone or the like is located between the light transmitter and the vibrator. This reduces damping of vibration.

This configuration prevents deformation and damage of the light transmitter 10 and the support and improves the durability of the vibration device 2.

Modification Example 1 According to Example Embodiment 1

Figure 5A:
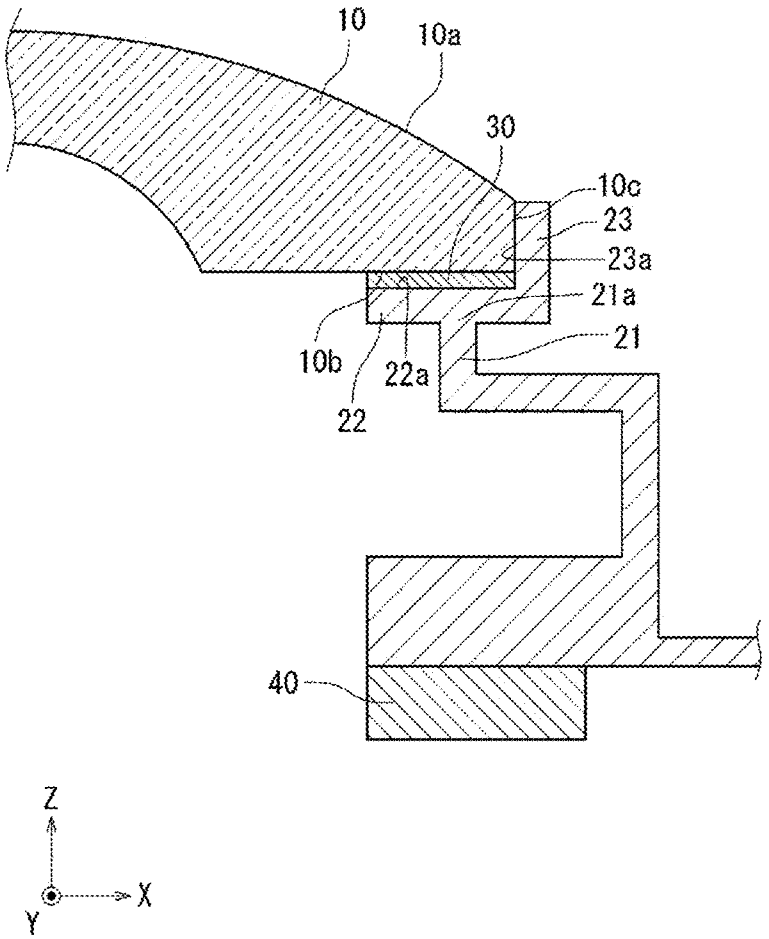
FIG. 5A is a cross-sectional partial view of a vibration device according to a modification example of Example Embodiment 1 of the present invention.

As illustrated in FIG. 5A, the metal structure 30 may be located between the support surface 22*a* of the support portion 22 and the second surface 10*b* of the light transmitter 10 in the compressed state.

The configuration mentioned above makes it possible to prevent liquid droplets from entering the vibration device 2. This configuration reduces damping of the vibration transmitted to the light transmitter 10 through the vibrator 20. This reduces damping of vibration.

Modification Example 2 According to Example Embodiment 1

Figure 5B:
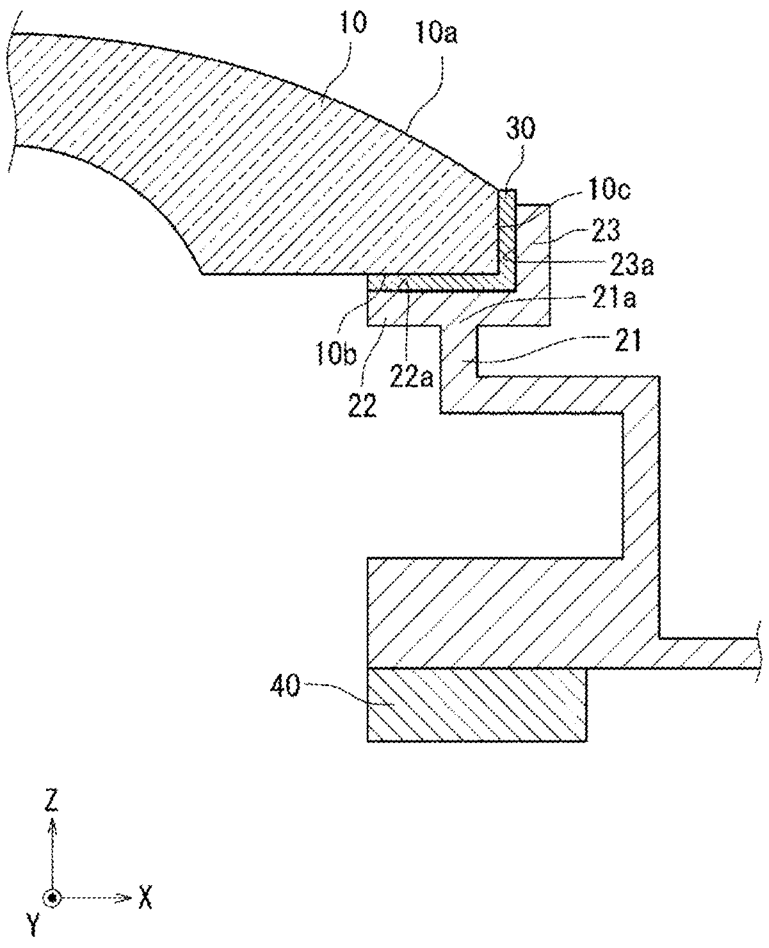
FIG. 5B is a cross-sectional partial view of a vibration device according to a modification example of Example Embodiment 1 of the present invention.

As illustrated in FIG. 5B, the metal structure 30 may be located, in the compressed state, between the rib inner peripheral surface 23*a* of the rib 23 and the third surface 10*c* of the light transmitter 10 and between the support surface 22*a* of the support portion 22 and the second surface 10*b* of the light transmitter 10. As for the metal structure 30, the portion located between the rib inner peripheral surface 23*a* and the third surface 10*c* and the portion located between the support surface 22*a* and the second surface 10*b* may be one continuous structure or may be separate structures.

The configuration mentioned above makes it possible to prevent liquid droplets from entering the vibration device 2. This configuration reduces damping of the vibration transmitted to the light transmitter 10 through the vibrator 20.

Modification Example 3 of Example Embodiment 1

Figure 5C:
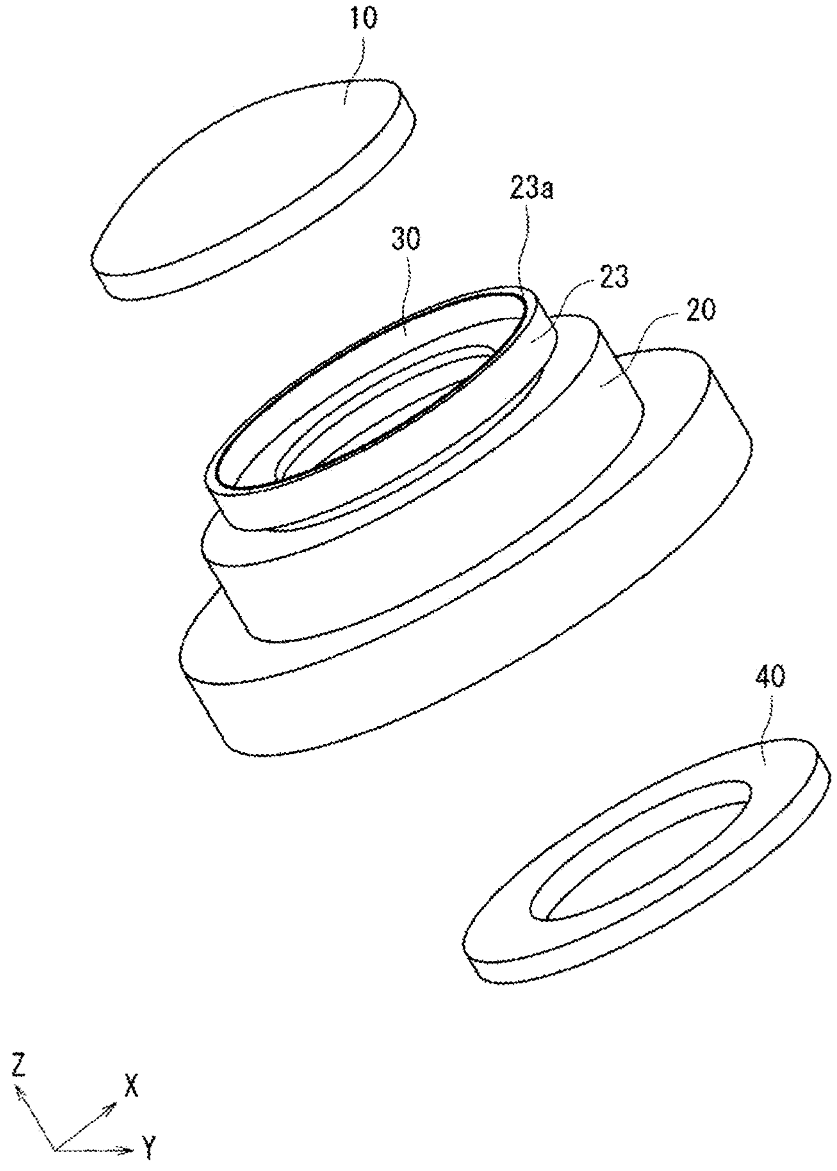
FIG. 5C is an exploded perspective view of a vibration device according to a modification example of Example Embodiment 1 of the present invention.

As illustrated in FIG. 5C, the metal structure 30 may include a metal film provided on the portion that supports the light transmitter. Specifically, the metal structure 30 may include a metal film provided between the rib inner peripheral surface 23*a* of the rib 23 of the vibrator 20 and the third surface 10*c* of the light transmitter 10. The metal film is provided, for example, on the portion that supports the light transmitter 10 by sputtering.

As mentioned in Modification Example 1 of Example Embodiment 1, in the case in which the metal structure 30 is located between the support surface 22*a* of the support portion 22 and the second surface 10*b* of the light transmitter 10, the metal structure 30 may include a metal film provided on the support surface 22*a*.

As mentioned in Modification Example 2 of Example Embodiment 1, in the case in which the metal structure 30 is located between the support surface 22*a* of the support portion 22 and the second surface 10*b* of the light transmitter 10 and between the rib inner peripheral surface 23*a* of the rib 23 and the third surface 10*c* of the light transmitter 10, the metal structure 30 may be a metal film provided on the support surface 22*a* and the rib inner peripheral surface 23*a*.

Since the configuration mentioned above enables the metal structure 30 and the vibrator 20 to be prepared as one unitary structure, the material cost and the assembly cost can be saved, and in turn, the production cost can be saved. In addition, this configuration improves the adhesion between the support that supports the light transmitter 10 and the metal structure 30. This makes it possible to reduce damping of vibration.

Modification Example 4 of Example Embodiment 1

Figure 5D:
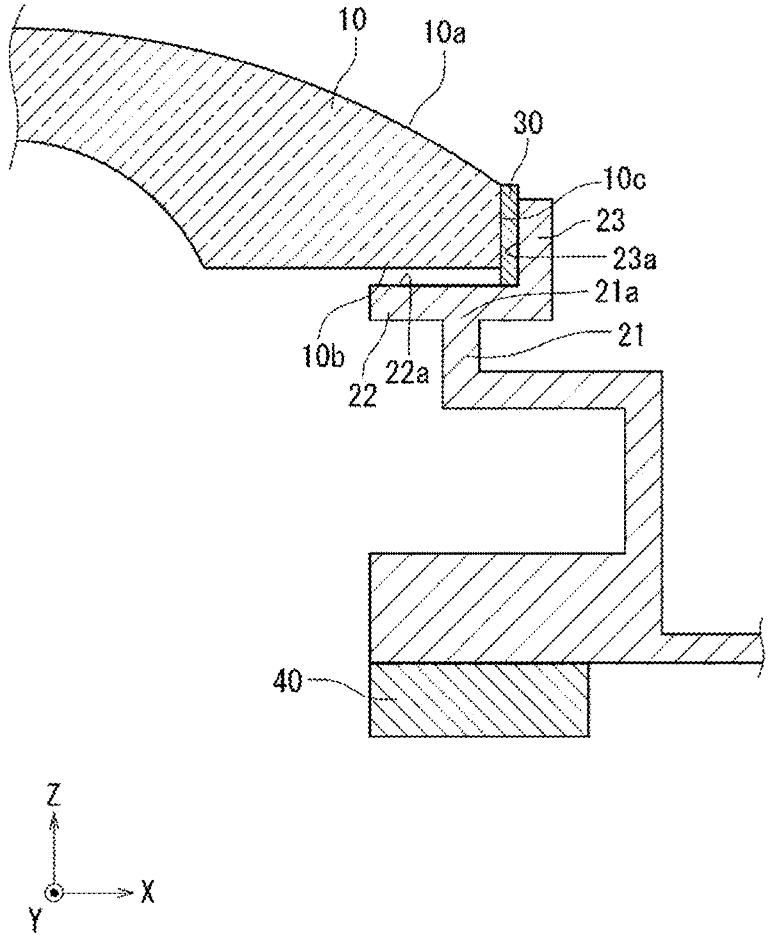
FIG. 5D is a cross-sectional partial view of a vibration device according to a modification example of Example Embodiment 1 of the present invention.

As illustrated in FIG. 5D, a configuration in which the metal structure 30 is located between the rib inner peripheral surface 23*a* of the rib 23 and the third surface 10*c* of the light transmitter 10 but not located between the support surface 22*a* of the support portion 22 and the second surface 10*b* of the light transmitter 10 is possible. Since the light transmitter 10 is supported by the rib 23 with the metal structure 30 interposed therebetween, the second surface 10*b* of the light transmitter 10 does not have to be supported by the support surface 22*a* of the support portion 22. In other words, the second surface 10*b* of the light transmitter 10 may be spaced away from the support surface 22*a* of the support portion 22.

The configuration mentioned above makes it possible to reduce damping of the vibration transmitted to the light transmitter 10 through the vibrator 20. Thus, it is possible to reduce damping of vibration.

Modification Example 5 of Example Embodiment 1

Figure 5E:
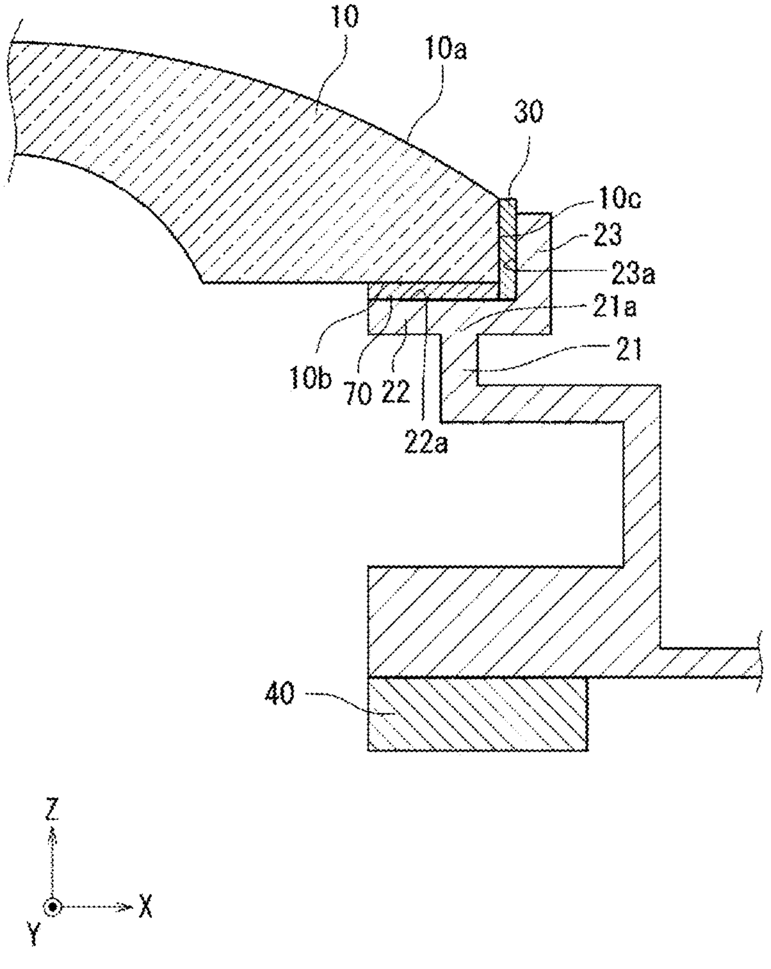
FIG. 5E is a cross-sectional partial view of a vibration device according to a modification example of Example Embodiment 1 of the present invention.

As illustrated in FIG. 5E, an adhesive 70 may be provided between the light transmitter 10 and the vibrator 20 except the portion where the metal structure 30 is located. Specifically, a configuration in which the metal structure 30 is located between the rib inner peripheral surface 23*a* of the rib 23 and the third surface 10*c* of the light transmitter 10, and the adhesive 70 is located between the support surface 22*a* of the support portion 22 and the second surface 10*b* of the light transmitter 10 is possible.

The adhesive 70 is, for example, an epoxy-based resin, an acrylic-based resin, or the like.

The adhesive 70 located as described above improves the adhesion between the light transmitter 10 and the vibrator 20. This in turn improves the vibration transmission ratio from the vibrator 20 to the light transmitter 10 and thus improves the vibration efficiency of the vibration device.

The adhesive 70 located as described above makes it possible to reduce damping of vibration, prevent liquid droplets from entering the vibration device, and in addition, prevent the light transmitter 10 from disengaging from the vibrator 20.

Modification Example 6 of Example Embodiment 1

Figure 5F:
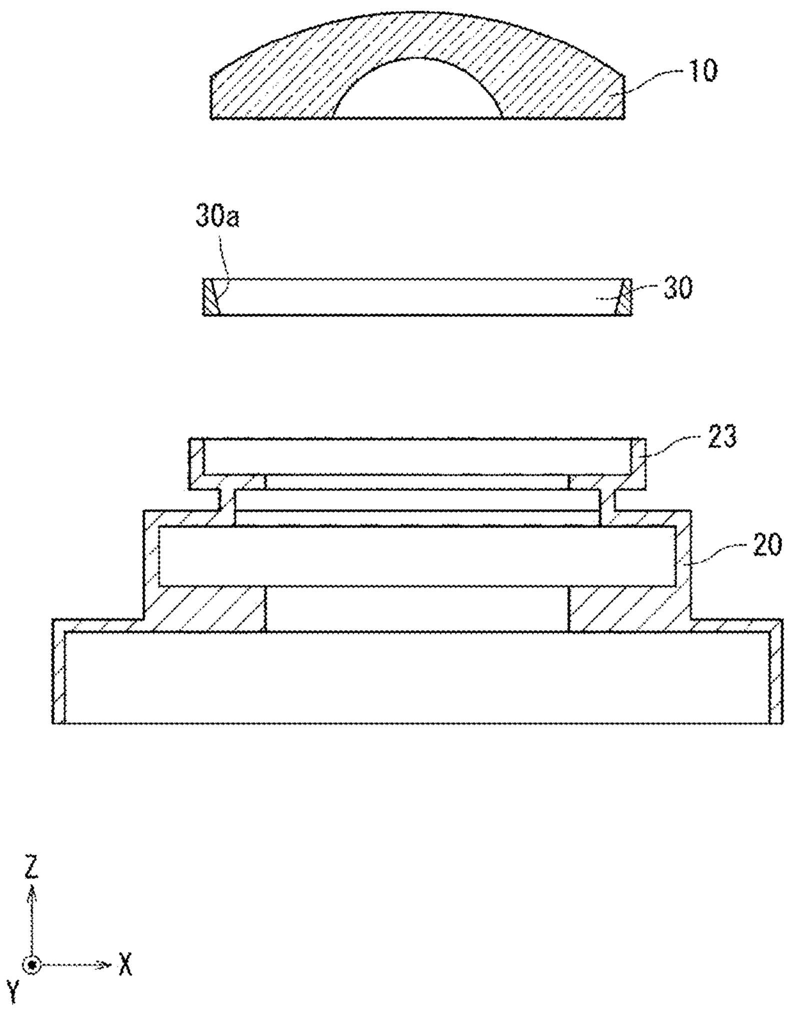
FIG. 5F is a cross-sectional view of a vibration device according to a modification example of Example Embodiment 1 of the present invention.

As illustrated in FIG. 5F, the metal structure 30 may include an inclined surface 30*a* on its inner peripheral side. This makes it easy to fit the light transmitter 10 into the rib 23 of the vibrator 20.

Example Embodiment 2

A vibration device according to Example Embodiment 2 of the present disclosure will be described. In Example Embodiment 2, mainly the differences from Example Embodiment 1 will be described. In the description of Example Embodiment 2, the elements or features the same as or similar to those in Example Embodiment 1 are denoted by the same e symbols. In Example Embodiment 2, the same description as in Example Embodiment 1 is omitted.

Figure 6:
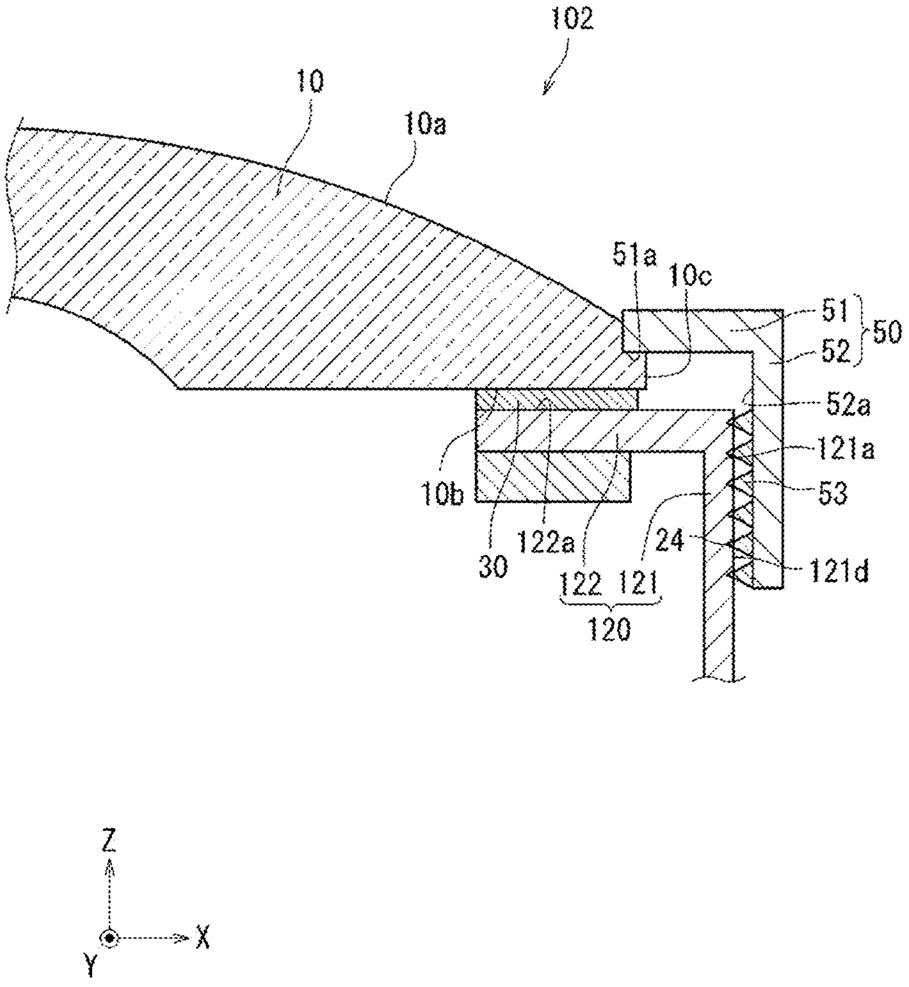
FIG. 6 is a cross-sectional partial view of a vibration device according to Example Embodiment 2 of the present invention.

As illustrated in FIG. 6, a vibration device 102 according to Example Embodiment 2 differs from the vibration device 2 according to Example Embodiment 1 in that the vibration device 102 further includes a holder 50 configured to be attached to a vibrator 120 and press the light transmitter 10 toward the vibrator 120. The vibration device 102 according to Example Embodiment 2 differs from the vibration device 2 according to Example Embodiment 1 in that the vibrator 120 does not include the rib.

Vibrator

As illustrated in FIG. 6, the vibrator 120 includes a body portion 121 and a support portion 122 protruding inward from the body portion 121.

The body portion 121 has a hollow cylindrical shape. The body portion 121 includes one end 121*a* on the side of which the light transmitter 10 is located and an outer surface 121*d*. The outer surface 121*d* includes a first thread portion 24. The first thread portion 24 is configured to be connected to a second thread portion 53 of the holder 50 described later. The first thread portion 24 in the present example embodiment is, for example, an inner thread.

The support portion 122 is a plate-shaped structure continuous with the one end 121*a* of the body portion 121 and extending so as to protrude inward from the one end 121*a* of the body portion 121. The support portion 122 is, for example, a flange as with the support portion 122 of the vibrator 120 in Example Embodiment 1. The support portion 122 has, for example, a circular loop shape when viewed in the thickness direction Z. The support portion 122 includes a support surface 122*a* on the side of which the light transmitter 10 is located.

Holder

The holder 50 is configured to support the light transmitter 10. The holder 50 supports the light transmitter 10 so as to press the light transmitter 10 from the first surface 10*a* of the light transmitter 10 toward the vibrator 120.

As illustrated in FIG. 6, the holder 50 includes a hollow cylindrical side wall 52 and a pressing portion 51 protruding inward from the side wall 52.

The side wall 52 surrounds the third surface 10*c* of the light transmitter 10. The side wall 52 includes an inner side surface 52*a* configured to face the third surface 10*c* of the light transmitter 10. The side wall 52 has a loop shape extending along the third surface 10*c* when viewed in the thickness direction Z. The side wall 52 has, for example, a circular loop shape when viewed in the thickness direction Z.

The side wall 52 is fixed to the vibrator 120. Specifically, the inner side surface 52*a* of the side wall 52 is fixed to the outer surface 121*d* of the vibrator 120.

The inner side surface 52*a* includes the second thread portion 53. The second thread portion 53 is configured to be connected to the first thread portion 24 formed on the vibrator 120. Specifically, the connection between the first thread portion 24 and the second thread portion 53 causes the holder 50 to be fixed to the vibrator 120. In the present example embodiment, the second thread portion 53 is, for example, an outer thread, and the second thread portion 53 is engaged with the first thread portion 24, which is an inner thread, in a manner of thread engagement.

The pressing portion 51 extends inward from the side wall 52. The pressing portion 51 includes a pressing surface 51*a* located on the side of the first surface 10*a* of the light transmitter 10 and configured to press the first surface 10*a* of the light transmitter 10. The pressing portion 51 has, for example, a loop shape adapted to the shape of the first surface 10*a* of the light transmitter 10 when viewed in the thickness direction Z. The pressing portion 51 has, for example, a circular loop shape when viewed in the thickness direction Z.

Examples of materials that can be used for the holder 50 include a ceramic, or a metal such as stainless steel, aluminum, iron, titanium, or duralumin. The surface of the holder 50 may be subjected to oxidation treatment or alumite treatment as with that of the vibrator 120.

Metal Structure

The metal structure 30 is located between the support surface 122*a* of the support portion 122 and the second surface 10*b* of the light transmitter 10 in the compressed state. Examples of the state of being compressed include the state of being pressed by and between the light transmitter 10 and a support that supports the light transmitter 10, specifically, the vibrator 120. Examples of the state of being compressed include the state in which the second surface 10*b* of the light transmitter 10 is in close contact with the support surface 122*a* of the support portion 122.

The metal structure 30 is compressed between the support surface 122*a* of the support portion 122 and the second surface 10*b* of the light transmitter 10 by the thread engagement between the first thread portion 24 of the vibrator 120 and the second thread portion 53 of the holder 50.

Advantageous Effects

In the vibration device 102 having the configuration described above, the holder 50 and the vibrator 120 support the light transmitter 10. This configuration makes it possible to keep the metal structure 30 compressed and reduce damping of the vibration transmitted from the vibrator 120 to the light transmitter 10 through the metal structure 30.

In the vibration device 102 having the configuration described above, the holder 50 and the vibrator 120 cause the metal structure 30 located between the light transmitter 10 and the vibrator 120 to be compressed. Hence, it is possible to seal the gap between the light transmitter 10 and the vibrator 120 and prevent liquid droplets from entering the vibration device 102.

The configuration mentioned above makes it possible to prevent the light transmitter 10 from peeling off or coming off the vibrator 120 and improve the durability of the vibration device 102.

Modification Example 1 of Example Embodiment 2

Figure 7A:
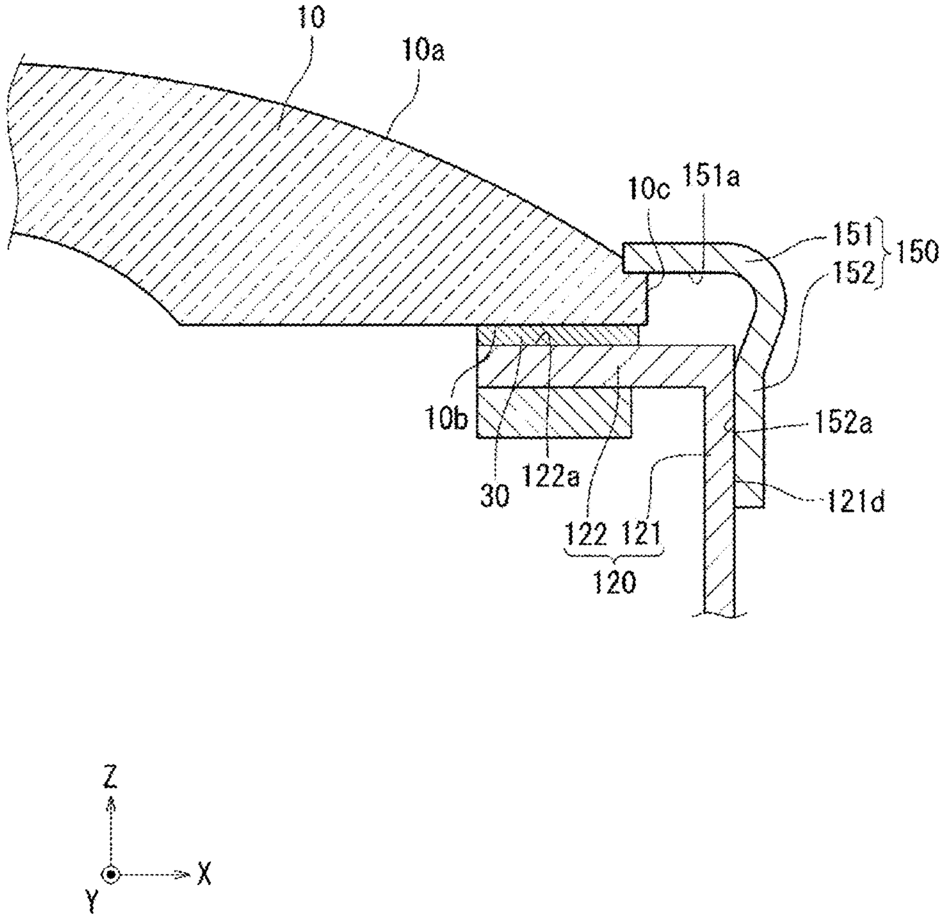
FIG. 7A is a cross-sectional partial view of a vibration device according to a modification example of Example Embodiment 2 of the present invention.

Although the holder 50 in the vibration device 102 according to Example Embodiment 2 presses the light transmitter 10 by the thread engagement between the second thread portion 53 and the first thread portion 24 of the vibrator 120, a holder 150 may include, for example, a plate spring as illustrated in FIG. 7A.

The holder 150 includes a plate spring including a pressing portion 151 and a side wall 152, and the restoring force of the plate spring may cause the pressing portion 151 to press the first surface 10*a* of the light transmitter 10. The light transmitter 10 being pressed by the restoring force of the plate spring compresses the metal structure 30.

The restoring force of the plate spring causes the side wall 152 of the holder 150 to press the outer surface 121*d* of the body portion 121 of the vibrator 120, and thereby the holder 150 is fixed to the vibrator 120.

The configuration mentioned above enables the holder 150 to be easily fixed to the vibrator 120 and prevents the light transmitter 10 from peeling off and disengaging from the vibrator 120. This in turn contributes to reduction of damping of vibration.

Modification Example 2 of Example Embodiment 2

As mentioned in a modification example of Example Embodiment 1, an adhesive may be provided between the light transmitter 10 and the support that supports the light transmitter 10, except the portion where the metal structure 30 is located.

Figure 7B:
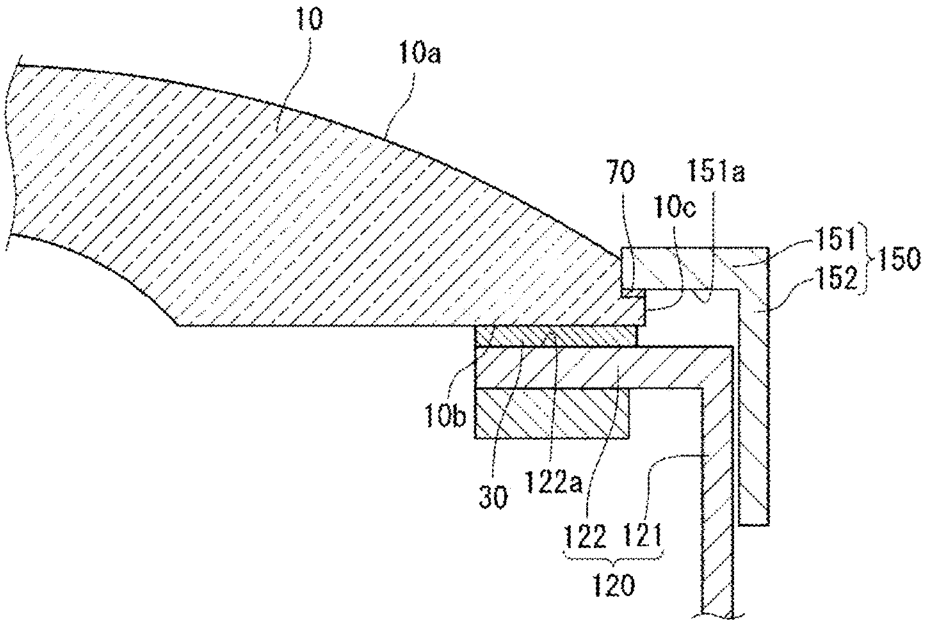
FIG. 7B is a cross-sectional partial view of a vibration device according to a modification example of Example Embodiment 2 of the present invention.
Figure 7B:
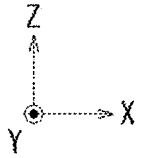

Specifically, as illustrated in FIG. 7B, an adhesive 70 may be located between a pressing surface 151*a* of the holder 150 and the first surface 10*a* of the light transmitter 10. The adhesive 70 is located, for example, so as to extend along the entire outer periphery of the first surface 10*a* of the light transmitter 10.

The adhesive 70 located as described above improves the adhesion between the light transmitter 10 and the vibrator 120. This in turn improves the vibration transmission ratio from the vibrator 120 to the light transmitter 10 and thus improves the vibration efficiency of the vibration device 102.

The adhesive 70 located as described above reduces damping of vibration, prevents liquid droplets from entering the vibration device 102, and in addition, prevents the light transmitter 10 from disengaging from the vibrator 120.

Modification Example 3 of Example Embodiment 2

Figure 7C:
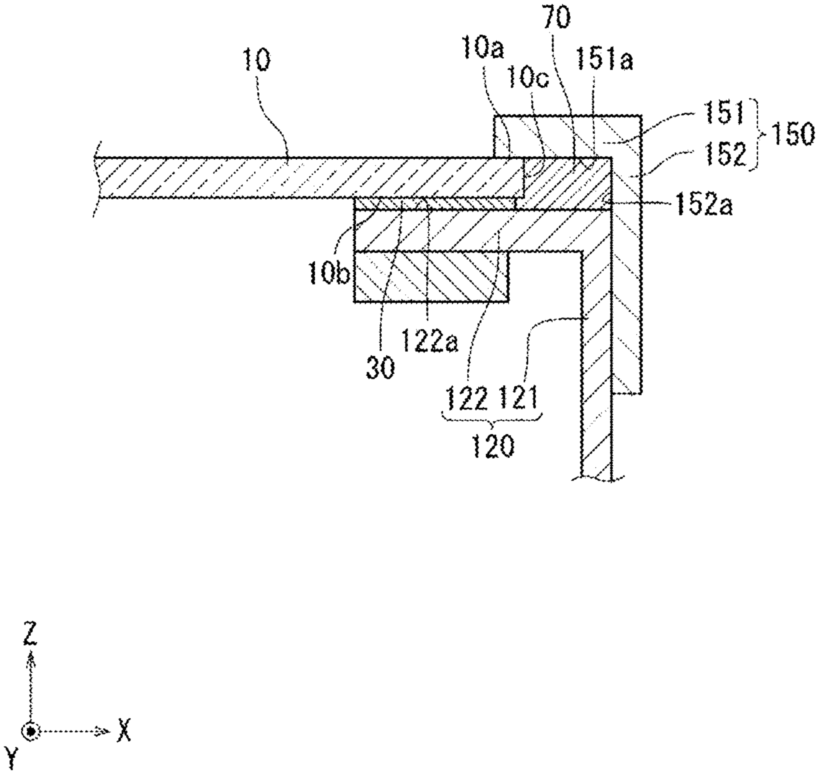
FIG. 7C is a cross-sectional partial view of a vibration device according to a modification example of Example Embodiment 2 of the present invention.

As illustrated in FIG. 7C, an adhesive 70 may be located between the inner side surface 152*a* of the side wall 152 of the holder 150 and the third surface 10*c* of the light transmitter 10. The adhesive 70 is located, for example, so as to extend along the entire third surface 10*c* of the light transmitter 10.

Note that as in the configuration illustrated in FIG. 7C, the light transmitter 10 may have a flat plate shape having flat first and second surfaces 10*a* and 10*b*. The light transmitter 10 has, for example, a disk shape when viewed in the thickness direction Z.

The adhesive 70 located as described above improves the adhesion between the light transmitter 10 and the vibrator 120. This in turn improves the vibration transmission ratio from the vibrator 120 to the light transmitter 10 and thus improves the vibration efficiency of the vibration device.

The adhesive 70 located as described above reduces damping of vibration, prevents liquid droplets from entering the vibration device 102, and in addition prevents the light transmitter 10 from disengaging from the vibrator 120.

Modification Example 4 of Example Embodiment 2

Further, the support that supports the light transmitter 10 may include at least one of a protrusion 81 and a recess 80 between the adhesive 70 and the metal structure 30 to separate the adhesive 70 from the metal structure 30.

Figure 7D:
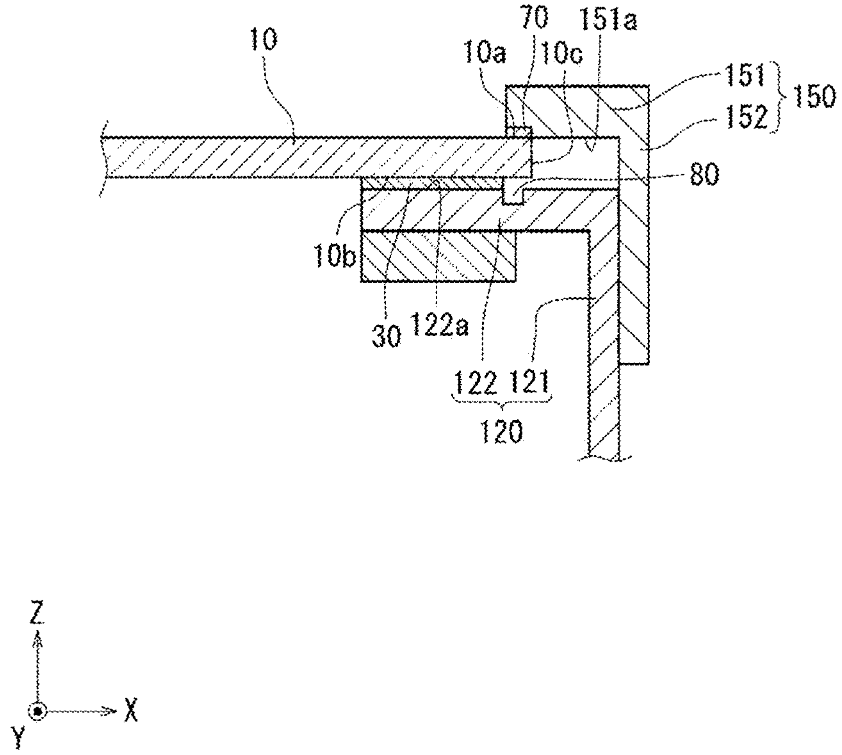
FIG. 7D is a cross-sectional partial view of a vibration device according to a modification example of Example Embodiment 2 of the present invention.

For example, as illustrated in FIG. 7D, the recess 80 is provided in the support surface 122*a* of the support portion 122. The recess 80 has, for example, a loop shape. The recess 80 has, for example, a circular loop shape adapted to the shape of the light transmitter 10.

The metal structure 30 is located on an inner portion of the support surface 122*a* relative to the recess 80.

With the configuration mentioned above, in the case in which the adhesive 70 spreads beyond its application range due to the wettability or the pressure of the holder 150, the adhesive 70 flows into the recess 80 and is prevented from making contact with the metal structure 30. In other words, it is possible to prevent the adhesive 70 from flowing into between the metal structure 30 and the light transmitter 10 and/or between the metal structure 30 and the vibrator 120. This makes it possible to maintain the functions of the metal structure 30 to prevent entrance of liquid droplets and to reduce absorption of vibration, and thereby reduce damping of vibration while preventing liquid droplets from entering the device. This enables the vibration efficiency of the vibration device 102 to be maintained.

Modification Example 5 of Example Embodiment 2

Figure 7E:
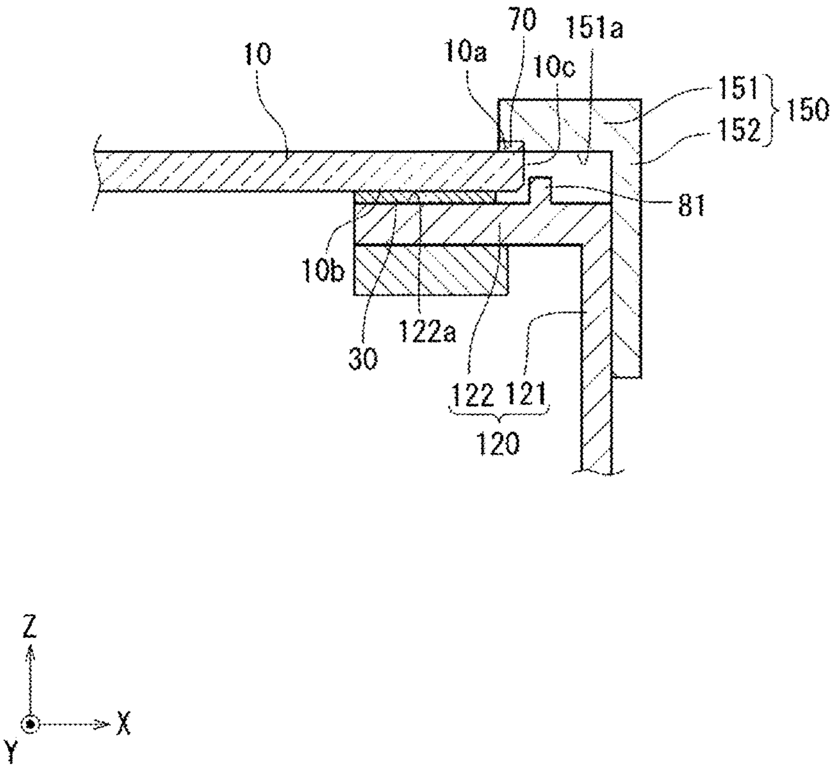
FIG. 7E is a cross-sectional partial view of a vibration device according to a modification example of Example Embodiment 2 of the present invention.

As illustrated in FIG. 7E, a protrusion 81 may be provided on the support surface 122*a* of the support portion 122. The protrusion 81 has, for example, a loop shape. The protrusion 81 has, for example, a circular loop shape adapted to the shape of the light transmitter 10.

The protrusion 81 is located so as not to overlap the light transmitter 10 when viewed in the thickness direction Z. The protrusion 81, for example, extends along the third surface 10*c* of the light transmitter 10.

The metal structure 30 is located in an inner portion of the support surface 122a relative to the protrusion 81.

Note that the support surface 122*a* may have both the recess 80 and the protrusion 81.

With the configuration mentioned above, in the case in which the adhesive 70 spreads beyond its application range due to the wettability or the pressure of the holder 150, the adhesive 70 is blocked by the protrusion 81 and prevented from making contact with the metal structure 30. In other words, it is possible to prevent the adhesive 70 from flowing into between the metal structure 30 and the light transmitter 10 and/or between the metal structure 30 and the vibrator 120. This makes it possible to maintain the functions of the metal structure 30 to prevent entrance of liquid droplets and to reduce absorption of vibration, and thereby reduce damping of vibration while preventing liquid droplets from entering the device.

Modification Example 6 of Example Embodiment 2

Figure 7F:
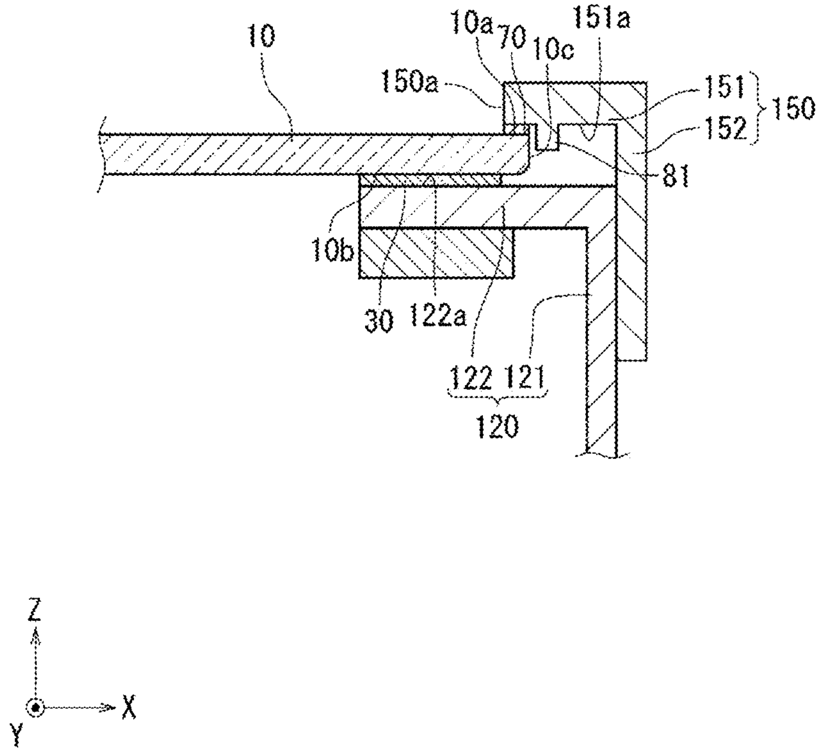
FIG. 7F is a cross-sectional partial view of a vibration device according to a modification example of Example Embodiment 2 of the present invention.

Further, as illustrated in FIG. 7F, the protrusion 81 may be provided on the holder 150. For example, the protrusion 81 may be provided on the pressing surface 151*a* of the pressing portion 151 of the holder 150.

The protrusion 81 is located so as not to overlap the light transmitter 10 when viewed in the thickness direction Z. The protrusion 81 has, for example, a loop shape extending along the third surface 10*c* of the light transmitter 10. The adhesive 70 is applied to, for example, a portion of the pressing surface 151*a* closer to one end 150*a* than the protrusion 81.

With the configuration mentioned above, in the case in which the adhesive 70 spreads beyond its application range due to the wettability or the pressure of the holder 150, the adhesive 70 is blocked by the protrusion 81 and prevented from making contact with the metal structure 30. In other words, it is possible to prevent the adhesive 70 from flowing into between the metal structure 30 and the light transmitter 10 and/or between the metal structure 30 and the vibrator 120. This makes it possible to maintain the functions of the metal structure 30 to prevent entrance of liquid droplets and to reduce absorption of vibration, and thereby reduce damping of vibration while preventing liquid droplets from entering the device.

Note that the pressing surface 151*a* may include the recess 80. The pressing surface 151*a* may include both the recess 80 and the protrusion 81. Further, both the support surface 122*a* of the support portion 122 of the vibrator 120 and the pressing surface 151*a* of the pressing portion 151 of the holder 150 may include the recess 80 and/or the protrusion 81.

Note that as mentioned in a modification example of Example Embodiment 1, also in the vibration device 102 of Example Embodiment 2, the metal structure 30 may include a metal film provided on the portion of the vibrator 120 that supports the light transmitter 10. Since the details were mentioned in Modification Example 3 of Example Embodiment 1, description thereof is omitted.

Example Embodiment 3

A vibration device according to Example Embodiment 3 of the present disclosure will be described. In Example Embodiment 3, mainly the differences from Example Embodiment 2 will be described. In the description of Example Embodiment 3, the elements or features the same as or similar to those in Example Embodiment 2 are denoted by the same symbols. In Example Embodiment 3, the same description as in Example Embodiment 2 is omitted.

Figure 8:
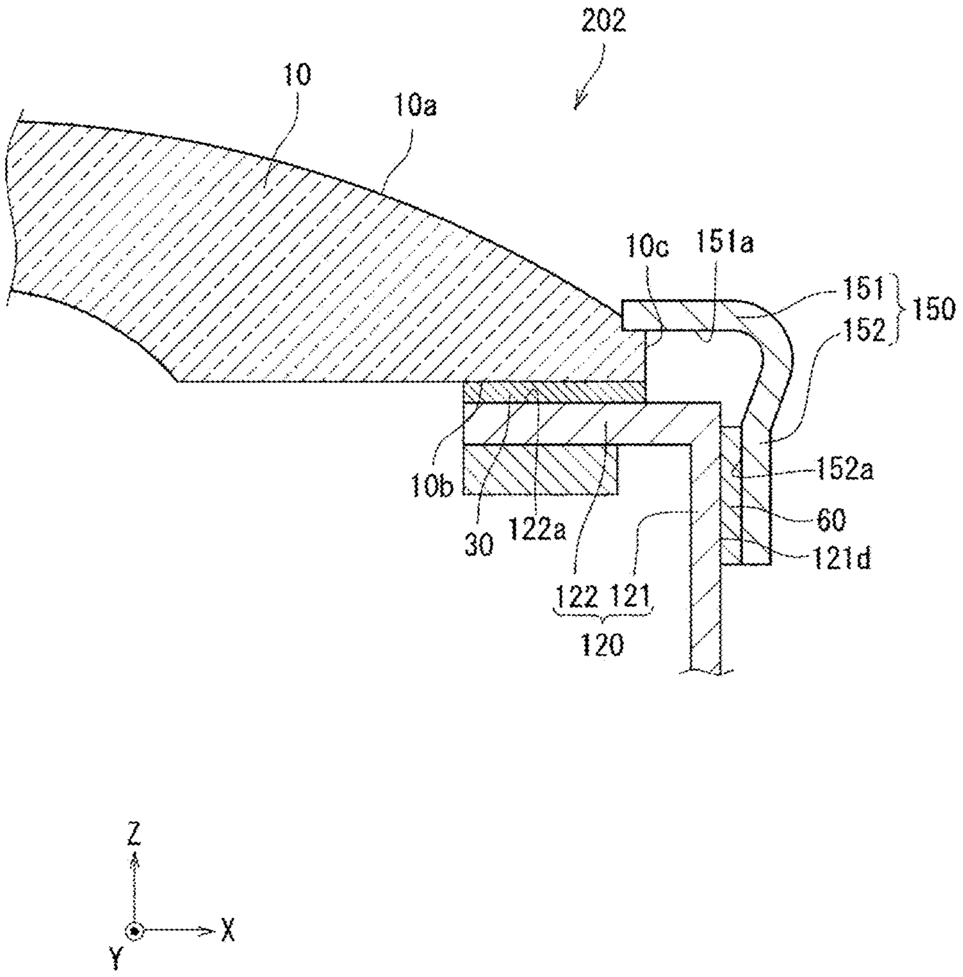
FIG. 8 is a cross-sectional partial view of a vibration device according to Example Embodiment 3 of the present invention.

As illustrated in FIG. 8, a vibration device 202 according to Example Embodiment 3 differs from the vibration device 102 of Example Embodiment 2 in that the vibration device 202 includes another metal structure 60 different from the metal structure 30, between the holder 150 and the vibrator 120. In the following, the metal structure 30 described in Example Embodiments 1 and 2 is referred to as a first metal structure 30, and the metal structure 60 different from the metal structure 30, located between the holder and the vibrator is referred to as a second metal structure 60.

Second Metal Structure

The second metal structure 60 is located, in the compressed state, between the inner side surface 152*a* of the side wall 152 of the holder 150 and the outer surface 121*d* of the body portion 121 of the vibrator 120. Examples of the state of being compressed include the state of being pressed by and between the side wall 152 of the holder 150 and the vibrator 120. The state of being compressed denotes the state in which the second metal structure 60 is pressed by and between the side wall 152 of the holder 150 and the vibrator 120 and deformed and distorted. This configuration causes the second metal structure 60 to be in contact with the side wall 152 of the holder 150 and the vibrator 120 without a gap.

The second metal structure 60 has a hollow cylindrical shape and has, for example, a loop shape when viewed in the thickness direction Z. The second metal structure 60 has, for example, a circular loop shape when viewed in the thickness direction Z. The distance between the inner periphery and the outer periphery of the second metal structure 60, in other words, the thickness of the second metal structure 60, is, for example, about 5 μm or more and about 2 mm or less. It is preferable that the thickness of the second metal structure 60 be about 10 μm or more and about 1 mm or less, for example. The second metal structure 60 has a smaller Young's modulus than the holder 150 and the vibrator 120. The Young's modulus of the second metal structure 60 is, for example, about 30 MPa or more and about 170 MPa or less or, for example, about 50 MPa or more and about 150 MPa or less.

Examples of the material of the second metal structure 60 include copper (the Young's modulus of which is 123 MPa).

With the configuration mentioned above, the first metal structure 30 and the second metal structure 60 prevent liquid droplets from entering the inside of the vibrator 120.

The configuration mentioned above makes it possible to prevent the light transmitter 10 from peeling off or coming off the vibrator 120 and improves the durability of the vibration device 202.

Note that the second metal structure 60 may be located between the holder 150 and the vibrator 120 regardless of the method of connection between the holder 150 and the vibrator 120. Specifically, also in the case in which the holder 150 and the vibrator 120 are connected by using a screw mechanism or by using the restoring force of the plate spring of the holder 150, as described above, the second metal structure 60 can be located between the holder 150 and the vibrator 120.

Modification Example of Example Embodiment 3

Figure 9:
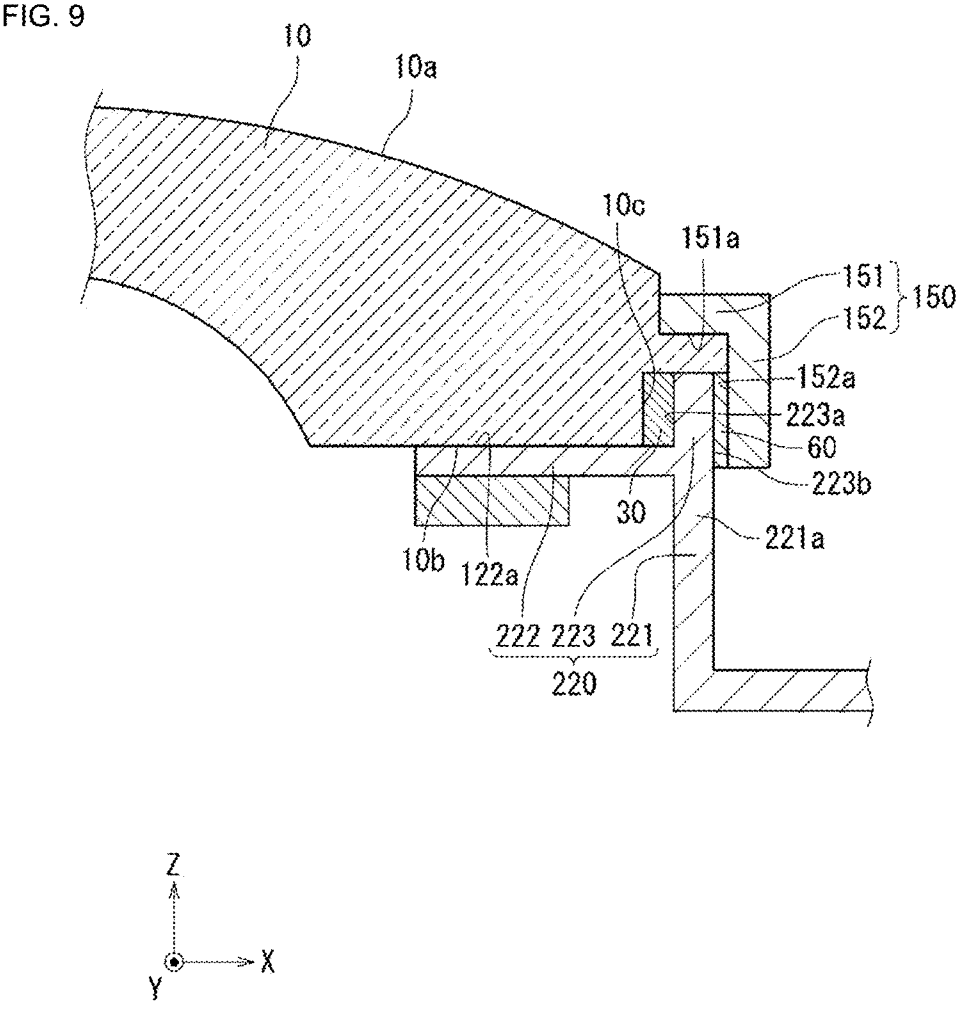
FIG. 9 is a cross-sectional partial view of a vibration device according to a modification example of Example Embodiment 3 of the present invention.

As illustrated in FIG. 9, in the vibration device according to Example Embodiment 3, a vibrator 220 may include a body portion 221, a support portion 222, and a rib 223, as explained in Example Embodiment 1.

The body portion 221 has a hollow cylindrical shape. The body portion 221 includes one end 221*a* on the side of which the light transmitter 10 is located.

The support portion 222 is a plate-shaped structure continuous with the one end 221*a* of the body portion 221 and protruding inward from the one end 221*a* of the body portion 221. The support portion 222 is, for example, a flange as with the support portion 22 of the vibrator 20 in Example Embodiment 1. The support portion 222 has, for example, a circular loop shape when viewed in the thickness direction Z. The support portion 222 includes a support surface 222*a* on the side of which the light transmitter 10 is located.

The rib 223 protrudes from the support portion 222 to the side on which the light transmitter 10 is located. The rib 223 extends in the thickness direction z. The rib 223 has a circular loop shape extending along the third surface 10*c* of the light transmitter 10 when viewed in the thickness direction Z. The rib 223 has, for example, a circular loop shape when viewed in the thickness direction Z. The rib 223 has a rib inner peripheral surface 223*a* that faces the third surface 10*c* of the light transmitter 10 and a rib outer peripheral surface 223*b* located opposite to the rib inner peripheral surface 223*a*.

In the case of the vibrator 220 having the configuration mentioned above, the second metal structure 60 is located, for example, between the rib 23 of the vibrator 220 and the holder 150 as illustrated in FIG. 9. Specifically, the second metal structure 60 is located between the rib outer peripheral surface 223*b* of the rib 23 of the vibrator 220 and the inner side surface 152*a* of the side wall 152 of the holder 150.

As described above, in the case in which the vibrator 220 including the rib 23 is used, the light transmitter 10 is fixed by two structures: the holder 150 and the vibrator 220. This configuration makes it possible to prevent the light transmitter 10 from disengaging from the vibrator 220. This makes it possible to reduce damping of vibration.

Example Embodiment 4

A vibration device according to Example Embodiment 4 of the present disclosure will be described. In Example Embodiment 4, mainly the differences from Example Embodiment 2 will be described. In the description of Example Embodiment 4, the elements or features the same as or similar to those in Example Embodiment 2 are denoted by the same symbols. In Example Embodiment 4, the same description as in Example Embodiment 2 is omitted.

Figure 10:
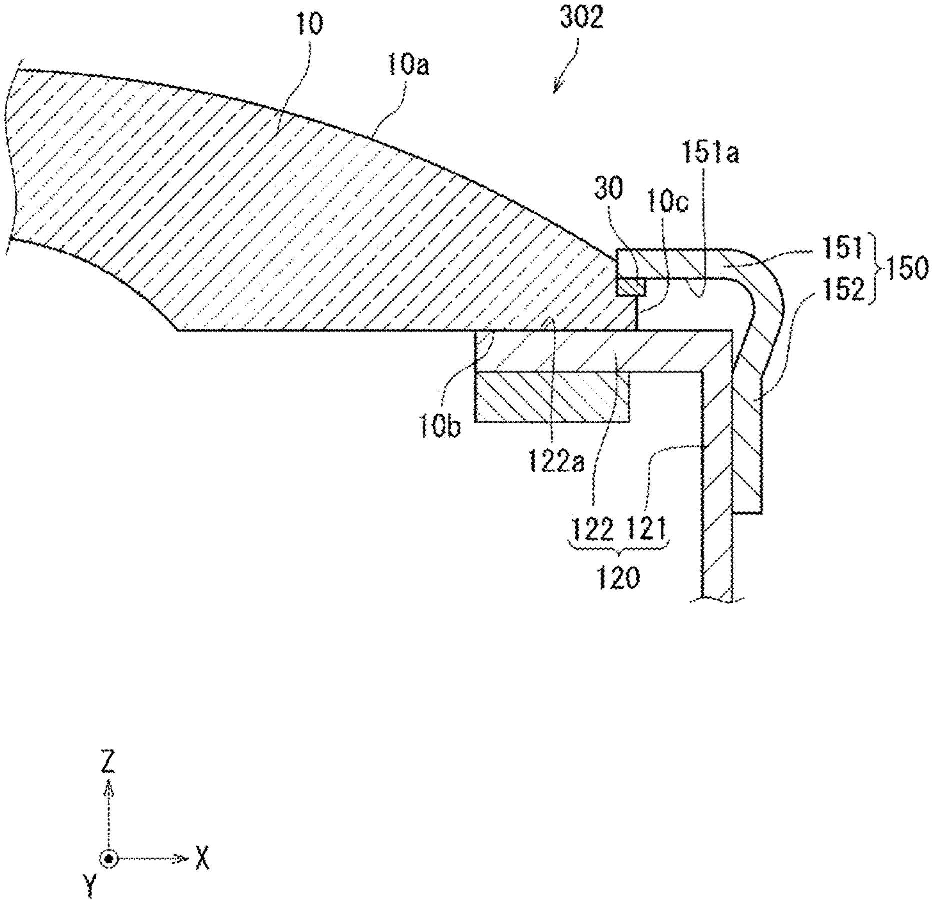
FIG. 10 is a cross-sectional partial view of a vibration device according to Example Embodiment 4 of the present invention.

A vibration device 302 according to Example Embodiment 4 differs from the vibration device 102 according to Example Embodiment 2 in that the first metal structure 30 is located between the holder 150 and the light transmitter 10 in the compressed state, as illustrated in FIG. 10. Although FIG. 10 illustrates the vibration device in which the holder is a plate spring, the holder may have a configuration including the first thread portion 24 described in Example Embodiment 2. In this case, the vibrator includes the second thread portion 53.

First Metal Structure

As illustrated in FIG. 10, the first metal structure 30 is located, for example, between the pressing surface 151*a* of the holder 150 and the first surface 10*a* of the light transmitter 10 in the compressed state.

The configuration mentioned above makes it possible to reduce damping of vibration while preventing liquid droplets from entering the vibration device 302.

Modification Example of Example Embodiment 4

Figure 11:
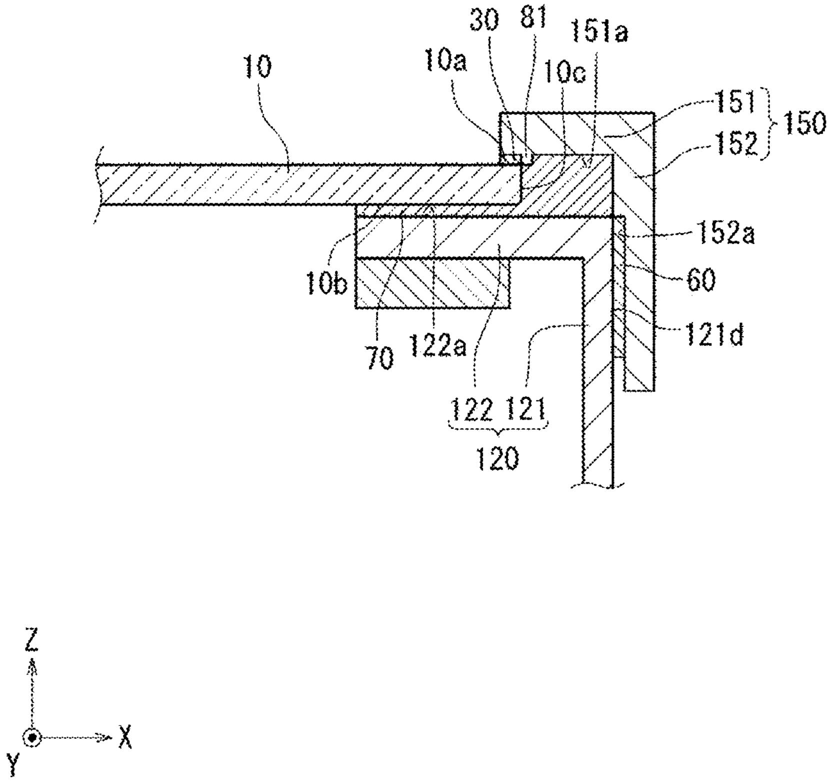
FIG. 11 is a cross-sectional partial view of a vibration device according to a modification example of Example Embodiment 4 of the present invention.

As illustrated in FIG. 11, also the vibration device 302 according to Example Embodiment 4 may include the adhesive 70, the protrusion 81 that separates the adhesive 70 from the first metal structure 30, and the second metal structure 60.

The adhesive 70 is provided between the light transmitter 10 and the structures that support the light transmitter 10, except the portion where the first metal structure 30 is located. In the present modification example, the structures that support the light transmitter 10 are the vibrator 120 and the holder 150. The adhesive 70 is located between the second surface 10*b* of the light transmitter 10 and the support surface 122*a* of the support portion 122 and between the third surface 10*c* of the light transmitter 10 and the side wall 152 of the holder 150. Since details of the adhesive 70 were mentioned in Modification Example 2 of Example Embodiment 2, description thereof is omitted.

The protrusion 81 is provided, for example, on the pressing surface 151*a* of the pressing portion 151 of the holder 150. Since details of the protrusion 81 were mentioned in Modification Example 6 of Example Embodiment 2, description thereof is omitted. Note that the protrusion 81 may be provided on the support surface 122*a* of the support portion 122 of the vibrator 120.

The second metal structure 60 is located between the vibrator 120 and the holder 150 in the compressed state. Since details of the second metal structure 60 were mentioned in Example Embodiment 3, description thereof is omitted.

The adhesive 70 located as described above improves the adhesion between the light transmitter 10 and the vibrator 120. This in turn improves the vibration transmission ratio from the vibrator 120 to the light transmitter 10 and thus improves the vibration efficiency of the vibration device 302.

The adhesive 70 located as described above reduces damping of vibration, prevents liquid droplets from entering the vibration device 302, and also prevents the light transmitter 10 from disengaging from the vibrator 120.

With the configuration as mentioned above, in the case in which the adhesive 70 spreads beyond its application range due to the wettability or the pressure of the holder 150, the adhesive 70 is blocked by the protrusion 81 and prevented from making contact with the first metal structure 30. In other words, it is possible to prevent the adhesive 70 from flowing into between the first metal structure 30 and the light transmitter 10 and/or between the first metal structure 30 and the vibrator 120. This makes it possible to maintain the functions of the first metal structure 30 to prevent entrance of liquid droplets and to reduce absorption of vibration, and thereby reduce damping of vibration while preventing liquid droplets from entering the device.

The configuration mentioned above enables the first metal structure 30 and the second metal structure 60 to prevent liquid droplets from entering the inside of the vibrator 120.

Also in the vibration device 302 according to Example Embodiment 4, the vibrator may include the rib 223 as mentioned in the modification example of Example Embodiment 3. Since the details were mentioned in the modification example of Example Embodiment 3, description thereof is omitted.

As described above, in the case of using the vibrator 220 including the rib 223, the light transmitter 10 is fixed by two structures: the holder 150 and the vibrator 220. This configuration makes it possible to prevent the light transmitter 10 from disengaging from the vibrator 220. This makes it possible to reduce damping of vibration.

Example Embodiment 5

A vibration device according to Example Embodiment 5 of the present disclosure will be described. In Example Embodiment 5, mainly the differences from Example Embodiment 4 will be described. In the description of Example Embodiment 5, the elements or features the same as or similar to those in Example Embodiment 4 are denoted by the same symbols. In Example Embodiment 5, the same description as in Example Embodiment 4 is omitted.

Figure 12:
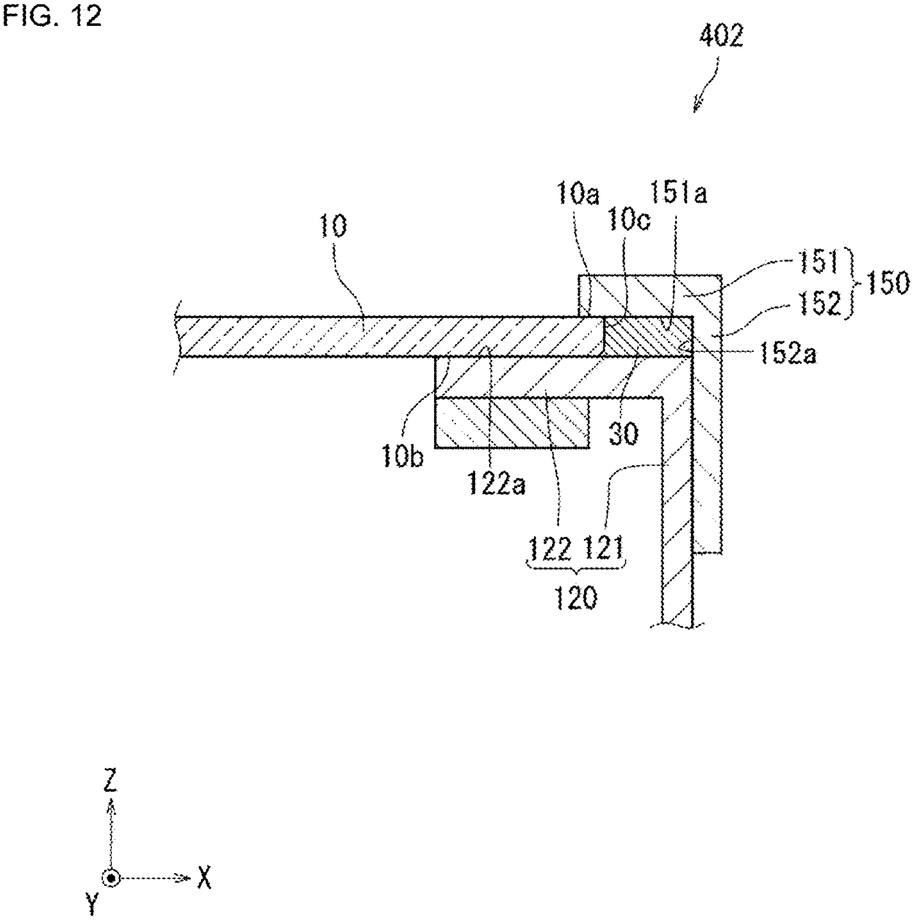
FIG. 12 is a cross-sectional partial view of a vibration device according to Example Embodiment 5 of the present invention.

In Example Embodiment 5, as illustrated in FIG. 12, the metal structure 30 is located, for example, between the inner side surface 152*a* of the side wall 152 of the holder 150 and the third surface 10*c* of the light transmitter 10 in the compressed state. In this case, the metal structure 30 which has a thickness larger than the dimension of the third surface 10*c* in the thickness direction Z is provided between the inner side surface 152*a* of the side wall 152 and the third surface 10*c* of the light transmitter 10, and the metal structure 30 is thus compressed by the holder 150 and the light transmitter 10.

In the present example embodiment, the light transmitter 10 may have a flat plate shape including flat first and second surfaces 10*a* and 10*b*. The light transmitter 10 has, for example, a disk shape when viewed in the thickness direction Z.

A vibration device 402 configured as described above makes it possible to reduce damping of vibration while preventing liquid droplets from entering the vibration device 402.

Modification Example of Example Embodiment 5

Figure 13:
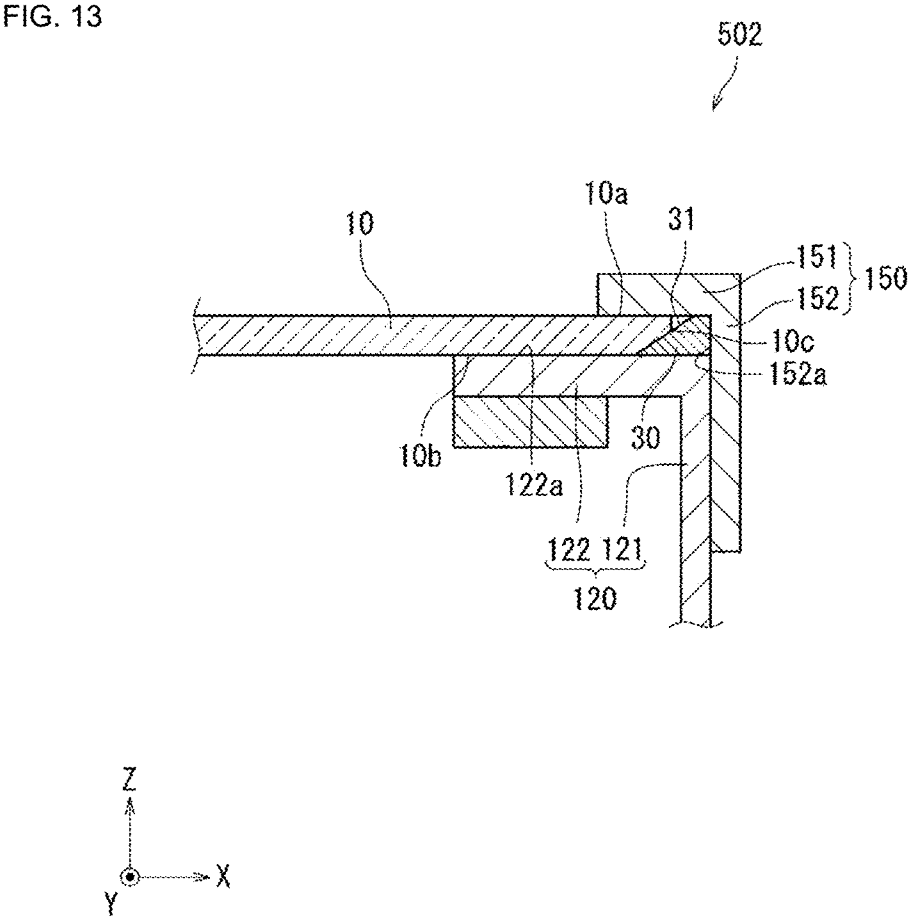
FIG. 13 is a cross-sectional partial view of a vibration device according to a modification example of Example Embodiment 5 of the present invention.

As illustrated in FIG. 13, the metal structure 30 may include an inclined surface 31 on the side facing the third surface 10*c*.

In a vibration device 502 configured as mentioned above, the light transmitter 10 makes contact with the inclined surface 31 and compresses the metal structure 30. Specifically, the metal structure 30 in the compressed state is in contact with the second surface 10*b* and the third surface 10*c* of the light transmitter 10. This makes it easy for the metal structure 30 to be in close contact with the light transmitter 10 and to eliminate the gap between the light transmitter 10 and the metal structure 30. This in turn prevents liquid droplets from entering the vibration device 502 and in addition reduces damping of vibration.

Example Embodiment 6

A vibration device according to Example Embodiment 6 of the present disclosure will be described. In Example Embodiment 6, mainly the differences from Example Embodiment 4 will be described. In the description of Example Embodiment 6, the elements or features the same as or similar to those in Example Embodiment 4 are denoted by the same symbols. In Example Embodiment 6, the same description as in Example Embodiment 4 is omitted.

Figure 14:
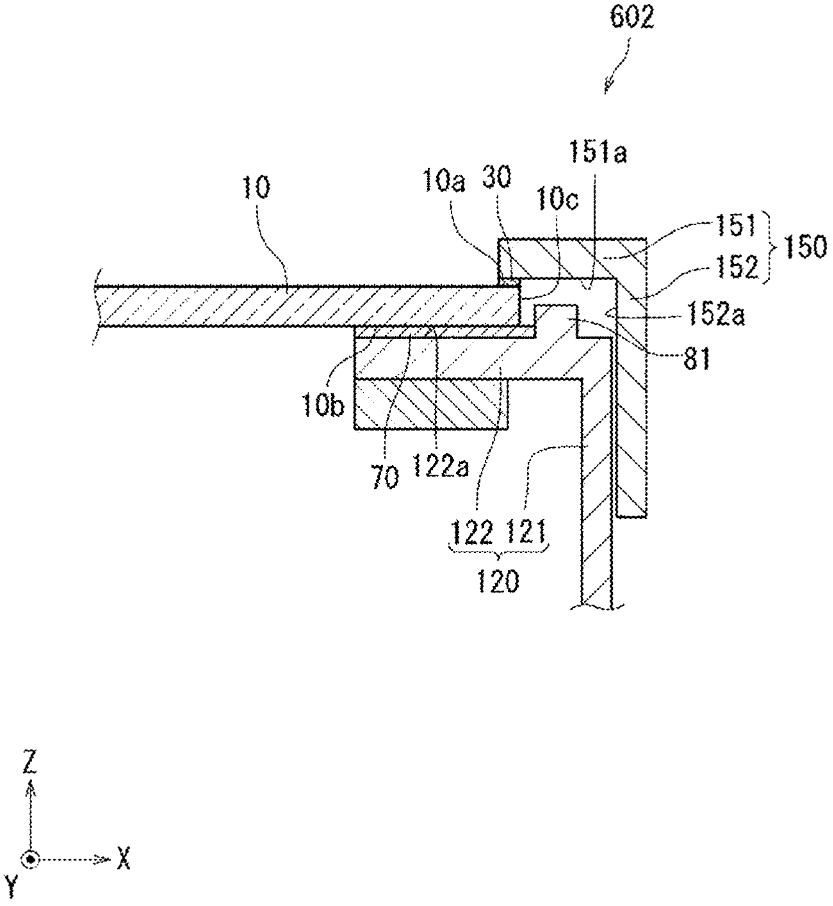
FIG. 14 is a cross-sectional partial view of a vibration device according to Example Embodiment 6 of the present invention.

A vibration device 602 according to Example Embodiment 6 differs from the vibration device of Example Embodiment 4 in that the adhesive 70 is provided between the light transmitter 10 and the vibrator 120 except the portion where the metal structure 30 is located, as illustrated in FIG. 14. In addition, the vibration device 602 according to Example Embodiment 6 differs from the vibration device of Example Embodiment 4 in that the vibration device 602 has the protrusion 81 that separates the adhesive 70 from the metal structure 30.

The adhesive 70 is provided between the light transmitter 10 and the structures that support the light transmitter 10, except the portion where the metal structure 30 is located. In the present example embodiment, the structures that support the light transmitter 10 are the vibrator 120 and the holder 150. In the present example embodiment, the adhesive 70 is located between the support surface 122*a* of the support portion 122 of the vibrator 120 and the second surface 10*b* of the light transmitter 10. Since details of the adhesive 70 were mentioned in Modification Example 2 of Example Embodiment 2, description thereof is omitted.

The protrusion 81 is located, for example, on the support surface 122*a* of the support portion 122 of the vibrator 120. Since details of the protrusion 81 were mentioned in Modification Example 6 of Example Embodiment 2, description thereof is omitted. Note that the support surface 122*a* of the support portion 122 of the vibrator 120 may include a recess that separates the adhesive 70 from the first metal structure 30.

The adhesive 70 located as described above improves the adhesion between the light transmitter 10 and the vibrator 120. This in turn improves the vibration transmission ratio from the vibrator 120 to the light transmitter 10 and thus improves the vibration efficiency of the vibration device 602.

The adhesive 70 located as described above prevents liquid droplets from entering the vibration device 602 and, in addition, prevents the light transmitter 10 from disengaging from the vibrator 120.

With the configuration as mentioned above, in the case in which the adhesive 70 spreads beyond its application range due to the wettability or the pressure of the holder 150, the adhesive 70 is blocked by the protrusion 81 and prevented from making contact with the metal structure 30. In other words, it is possible to prevent the adhesive 70 from flowing into between the metal structure 30 and the light transmitter 10 and/or between the metal structure 30 and the holder 150. This makes it possible to maintain the functions of the first metal structure 30 to prevent entrance of liquid droplets and to reduce absorption of vibration, and thereby reduce damping of vibration while preventing liquid droplets from entering the device.

Modification Example of Example Embodiment 6

Figure 15:
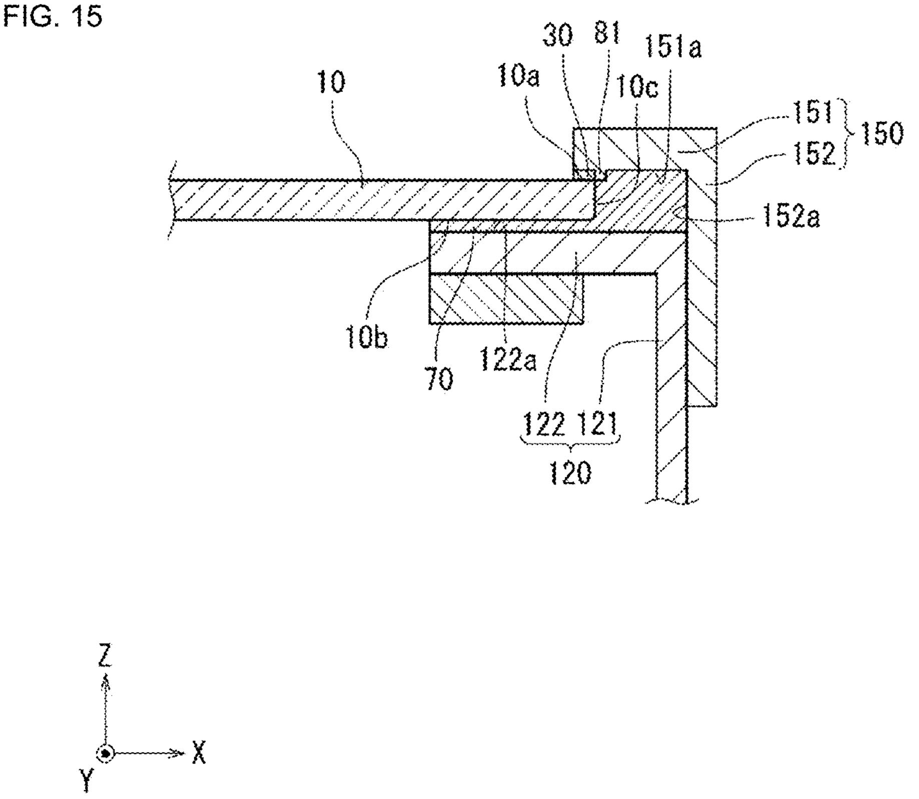
FIG. 15 is a cross-sectional partial view of a vibration device according to a modification example of Example Embodiment 6 of the present invention.

Further, as illustrated in FIG. 15, the protrusion 81 may be provided on the holder 150. For example, the protrusion 81 may be provided on the pressing surface 151*a* of the pressing portion 151 of the holder 150. Since the details were mentioned in Modification Example 6 of Example Embodiment 2, description thereof is omitted.

With the configuration mentioned above, in the case in which the adhesive 70 spreads beyond its application range due to the wettability or the pressure of the holder 150, the adhesive 70 is blocked by the protrusion 81 and prevented from making contact with the first metal structure 30. In other words, it is possible to prevent the adhesive 70 from flowing into between the metal structure 30 and the light transmitter 10 and/or between the metal structure 30 and the holder 150. This makes it possible to maintain the functions of the metal structure 30 to prevent entrance of liquid droplets and to reduce absorption of vibration, and thereby reduce damping of vibration while preventing liquid droplets from entering the device.

Example Embodiment 7

A vibration device according to Example Embodiment 7 of the present disclosure will be described. In Example Embodiment 7, mainly the differences from Example Embodiment 2 will be described. In the description of Example Embodiment 7, the elements or features the same as or similar to those in Example Embodiment 2 are denoted by the same symbols. In Example Embodiment 7, the same description as in Example Embodiment 2 is omitted.

Figure 16:
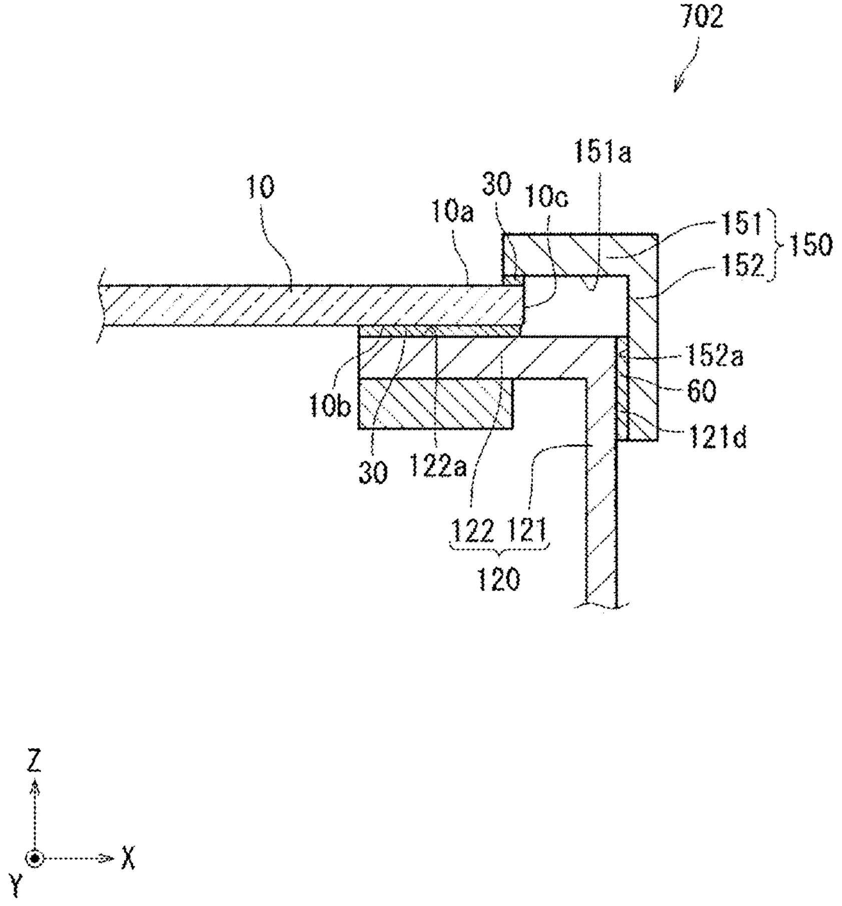
FIG. 16 is a cross-sectional partial view of a vibration device according to Example Embodiment 7 of the present invention.

A vibration device 702 according to Example Embodiment 7 differs from the vibration device 102 according to Example Embodiment 2 in that in addition to the first metal structure 30 located between the vibrator 120 and the light transmitter 10, a first metal structure 30 is located between the holder 150 and the light transmitter 10 in the compressed state, as illustrated in FIG. 16.

The first metal structure 30 located between the holder 150 and the light transmitter 10 in the compressed state, for example, extends along the entire outer periphery of the light transmitter 10.

Also in the present example embodiment, the second metal structure 60 may be located between the vibrator 120 and the holder 150 in the compressed state. Since details of the second metal structure 60 were mentioned in Example Embodiment 3, description thereof is omitted.

In the configuration mentioned above, the first metal structures 30 are located at two places between the light transmitter 10 and the holder 150 and between the light transmitter 10 and the vibrator 120 in the compressed state. This configuration makes it possible to reduce damping of vibration while preventing liquid droplets from entering the vibration device 302.

Note that in the vibration device 702 according to Example Embodiment 7, the vibrator 120 may include the rib 223. Since the details were mentioned in the modification example of Example Embodiment 3, description thereof is omitted. In addition, in the vibration device 702 according to Example Embodiment 7, the adhesive 70 may be located between the light transmitter 10 and the structures that support the light transmitter 10. Since the details were mentioned in Modification Example 3 of Example Embodiment 2, description thereof is omitted. In addition, in the vibration device 702 according to Example Embodiment 7, the structures that support the light transmitter 10 may have the recess 80 and/or the protrusion 81 that separate the adhesive 70 from the first metal structure 30. Since the details were mentioned in Modification Examples 4 to 6 of Example Embodiment 2, description thereof is omitted.

Implementation Example 1

As Implementation Example 1, a simulation to calculate the displacement of the light transmitter 10 is conducted on the vibration device according to Modification Example 4 of Example Embodiment 1. The simulation was conducted by using Femtet (Murata Software Co., Ltd). As a vibration condition in the simulation, the voltage applied to the piezoelectric body was set to 60 Vpp.

In the following, the space between the support surface of the support portion of the vibrator and the second surface of the light transmitter is also referred to as the α layer, and the space between the rib inner peripheral surface of the rib of the vibrator and the third surface of the light transmitter is also referred to as the β layer.

Figure 17A:
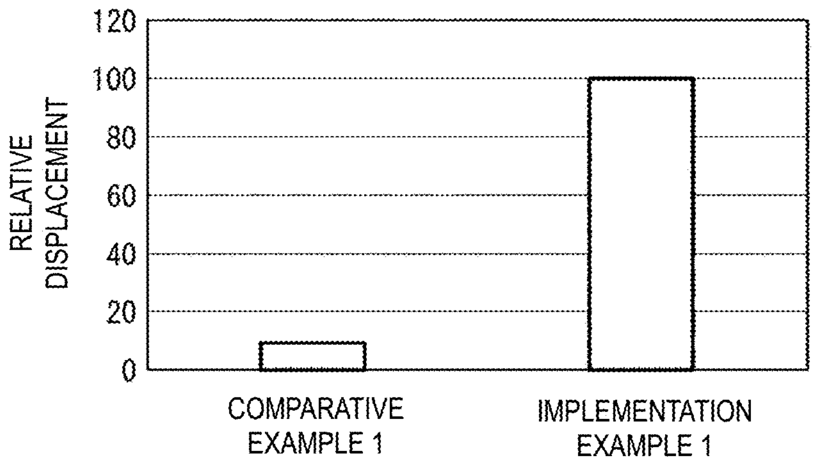
FIG. 17A is a graph showing the displacement of Implementation Example 1 and the displacement of Comparative Example 1.
Figure 17B:
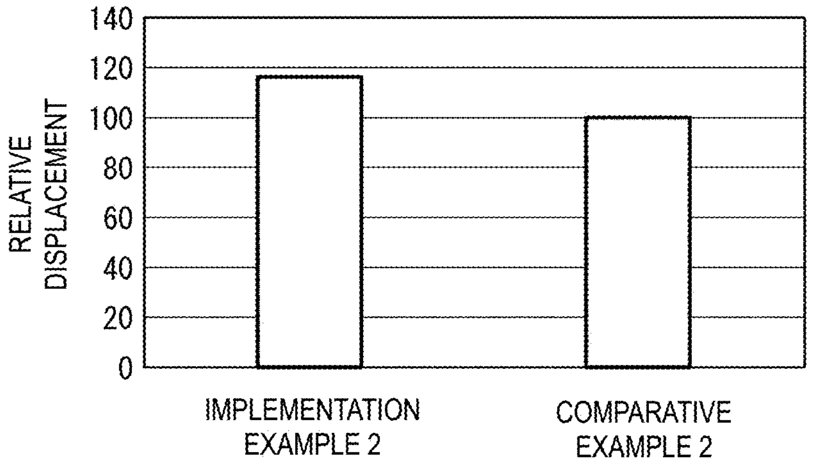
FIG. 17B is a graph showing the displacement of Implementation Example 2 and the displacement of Comparative Example 2.
Figure 17C:
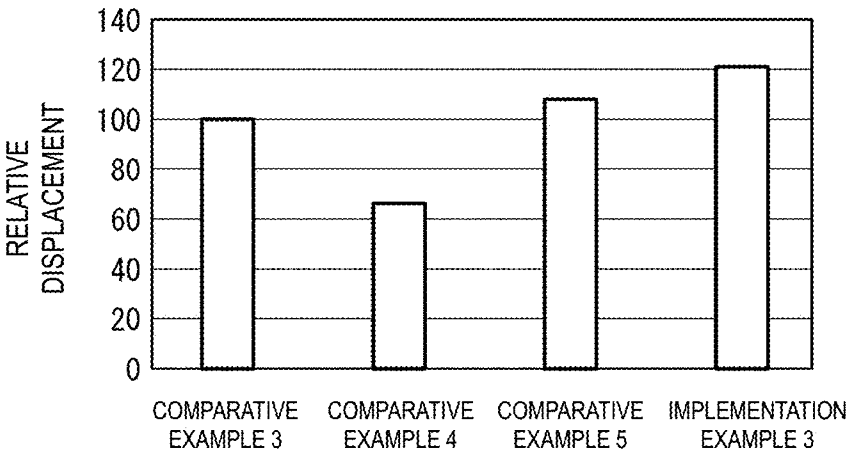
FIG. 17C is a graph showing the displacement of Implementation Example 3 and the displacement of Comparative Examples 3 to 5.
Figure 17D:
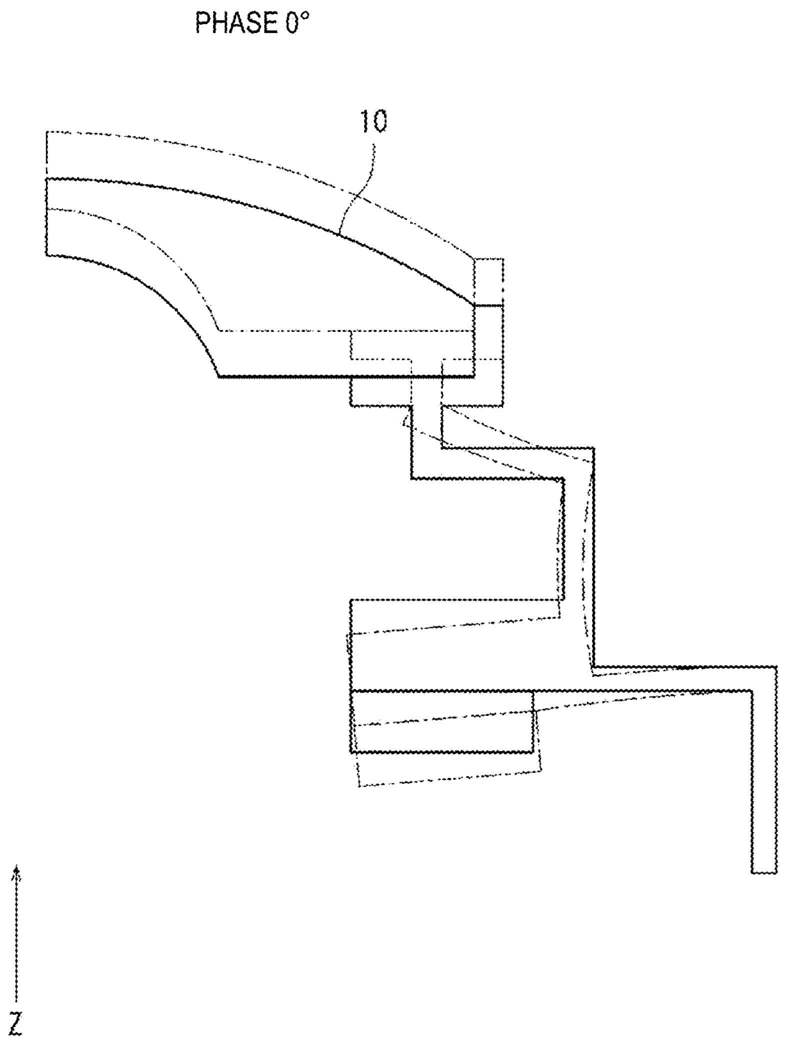
FIG. 17D is a diagram for explaining the displacements of Implementation Examples and Comparative Examples.
Figure 17E:
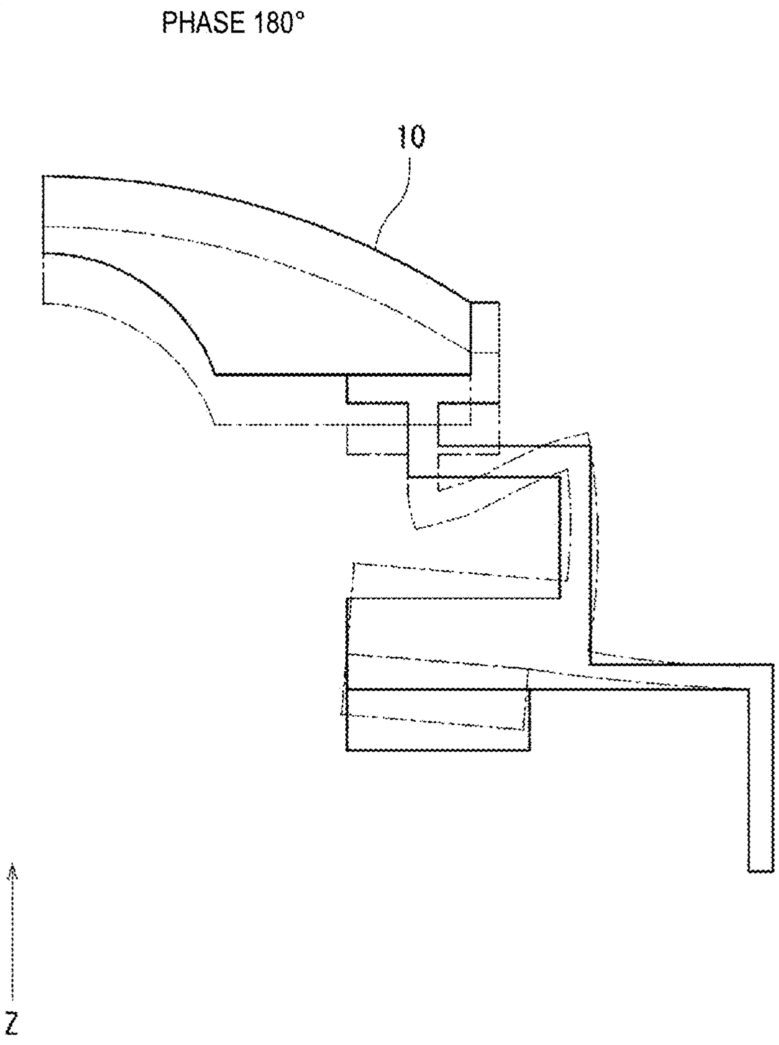
FIG. 17E is a diagram for explaining the displacements of Implementation Examples and Comparative Examples.

As illustrated in FIGS. 17D and 17E, the displacement is defined as the displacement of the vibration in the thickness direction Z of the light transmitter 10 between phase 0° and phase 180°. In FIGS. 17D and 17E, the solid lines depict the vibration device which is not vibrating, and the dashed dotted lines depict the vibration device which is vibrating.

In the following, the thickness of the α layer denotes the distance between the support surface of the support portion of the vibrator and the second surface of the light transmitter, and the thickness of the β layer denotes the distance between the rib inner peripheral surface of the rib of the vibrator and the third surface of the light transmitter.

The physical property values of the light transmitter, the vibrator, and the first metal structure used in Implementation Example 1 are shown in Table 1 below.

TABLE 1

| | Material | Density ($kg/m^3$) | Young's Modulus (GPa) | Qm |
|---|---|---|---|---|
| Light transmitter | Borosilicate | 2300 | 150 | 1500 |
| Vibrator | SUS420J2 (JIS Standards) | 7750 | 200 | 1500 |
| First Metal structure | Cu | 8950 | 123 | 1000 |

In Implementation Example 1, the thickness of the α layer was set to 50 μm, and the thickness of the β layer was set to 50 μm.

Comparative Example 1

Comparative Example 1 was configured to be the same as Implementation Example 1 except that a resin packing was provided in the β layer. The physical property values of the resin packing are shown in Table 2 below.

TABLE 2

| | Material | Density (kg/m$^3$) | Young's Modulus (GPa) | Qm |
|---|---|---|---|---|
| Resin Packing | Silicone | 950 | 0.003 | 1 |

FIG. 17A shows the results of Implementation Example 1 and Comparative Example 1. In the graph illustrated in FIG. 17A, the displacement of Implementation Example 1 is regarded as 100, and the displacement of Comparative Example 1 is expressed as the relative displacement with respect to the displacement of Implementation Example.

The graph illustrated in FIG. 17A shows that the displacement of the light transmitter in Implementation Example 1 having the first metal structure in the β layer is approximately 10 times that of Comparative Example 1 having the resin packing in the β layer. Hence, it is clear that the vibration efficiency of the light transmitter in Implementation Example 1 is higher than in Comparative Example 1. Hence, it is clear that absorption of the vibration transmitted to the light transmitter in Implementation Example 1 is lower than in Comparative Example 1.

Implementation Example 2

Implementation Example 2 was configured to be the same as Implementation Example 1 except that the first metal structure was provided in the α layer, and an adhesive was provided in the β layer. The physical property values of the adhesive are shown in Table 3 below.

TABLE 3

| | Material | Density (kg/m$^3$) | Young's Modulus (GPa) | Qm |
|---|---|---|---|---|
| Adhesive | Epoxy-Based Adhesive | 2500 | 3 | 10 |

Comparative Example 2

Comparative Example 2 was configured to be the same as Implementation Example 2 except that air was in the β layer.

FIG. 17B shows the results of Implementation Example 2 and Comparative Example 2. In the graph illustrated in FIG. 17B, the displacement of Comparative Example 2 is regarded as 100, and the displacement of Implementation Example 2 is expressed as the relative displacement with respect to the displacement of Comparative Example 2.

The graph illustrated in FIG. 17B shows that the displacement of the light transmitter in Implementation Example 2 in which the adhesive is located in the β layer is approximately 20% larger than in Comparative Example 2 in which the β layer is an air layer. Hence it is clear that the vibration efficiency of the light transmitter in Implementation Example 2 is higher than in Comparative Example 2. Hence, it is clear that absorption of the vibration transmitted light transmitter in Implementation Example 2 is lower than in Comparative Example 2.

Implementation Example 3

Implementation Example 3 was configured to be the same as Implementation Example 1 except that an adhesive was provided in the α layer. The adhesive is the same as the one in Implementation Example 2.

Comparative Example 3

Comparative Example 3 was configured to be the same as Implementation Example 3 except that an adhesive was provided in the β layer. The adhesive is the same as the one in Implementation Example 2.

Comparative Example 4

Comparative Example 4 was configured to be the same as Implementation Example 3 except that a resin packing was provided in the β layer. The location of the resin packing is the same as that of the resin packing of Comparative Example 1.

Comparative Example 5

Comparative Example 5 was configured to be the same as Implementation Example 3 except that air was in the β layer.

FIG. 17C shows the results of Implementation Example 3 and Comparative Examples 3 to 5. In the graph illustrated in FIG. 17C, the displacement of Comparative Example 3 is regarded as 100, and the displacements of Comparative Examples 4 and 5 and Implementation Example 3 are expressed as the relative displacements with respect to the displacement of Comparative Example 3.

The graph illustrated in FIG. 17C shows that the displacement of the light transmitter in Implementation Example 3 in which the first metal structure is located in the β layer is approximately 20% larger than in Comparative Example 3 in which the adhesive is located in the β layer. The displacement of the light transmitter in Implementation Example 3 in which the first metal structure is located in the β layer is larger than in Comparative Example 4 in which the resin packing is located in the β layer. The displacement of the light transmitter in the Implementation Example 3 in which the first metal structure is located in the β layer is larger than in Comparative Example 5 in which the β layer is an air layer. From the results above, it is clear that the vibration efficiency of the light transmitter in Implementation Example 3 is higher than in any of Comparative Examples 3 to 5. Hence, it is clear that absorption of the vibration transmitted to the light transmitter in Implementation Example 3 is lower than in Comparative Examples 3 to 5.

Although the present disclosure has been fully described on the basis of the example embodiments with reference to the accompanying drawings, various changes and modifications are clearly possible for those skilled in the art. Hence, it should be understood that such changes and modifications are included in the scope of the present disclosure defined by the attached claims unless they depart from the scope.

The vibration devices and the imaging devices according to example embodiments of the present disclosure are applicable to on-vehicle cameras, surveillance cameras, and optical sensors such as LiDARs, used outdoors.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration device comprising:

a light transmitter;

a vibrator to support the light transmitter;

a piezoelectric body located on or in the vibrator to vibrate the vibrator; and a first metal structure located, in a compressed state, between the light transmitter and a support that supports the light transmitter, and having a smaller Young's modulus than the light transmitter and the support that supports the light transmitter.

2. The vibration device according to claim 1, wherein the support that supports the light transmitter includes the vibrator; and the first metal structure is located between the light transmitter and the vibrator.

3. The vibration device according to claim 2, wherein the light transmitter includes a first surface and a second surface on a side opposite to the first surface;

the vibrator includes a hollow cylindrical body portion and a support portion located at one end of the body portion and including a support surface that supports the second surface of the light transmitter; and the first metal structure is located between the second surface of the light transmitter and the support surface of the support portion.

4. The vibration device according to claim 2, wherein the light transmitter includes a first surface, a second surface on a side opposite to the first surface, and a third surface connecting the first surface and the second surface;

the vibrator includes a hollow cylindrical body portion, a support portion located at one end of the body portion, and a rib protruding from the support portion in a direction in which the light transmitter is located;

the rib includes a rib inner peripheral surface that faces the third surface of the light transmitter; and the first metal structure is located between the third surface of the light transmitter and the rib inner peripheral surface of the rib.

5. The vibration device according to claim 1, further comprising a holder attached to the vibrator to press the light transmitter toward the vibrator.

6. The vibration device according to claim 5, wherein the support that supports the light transmitter includes the holder; and the first metal structure is located between the light transmitter and the holder.

7. The vibration device according to claim 6, wherein the light transmitter includes a first surface and a second surface on a side opposite to the first surface;

the vibrator includes a hollow cylindrical body portion and a support portion located at one end of the body portion and having a support surface that supports the second surface of the light transmitter;

the holder includes a pressing surface that supports the first surface of the light transmitter; and the first metal structure is located between the first surface of the light transmitter and the pressing surface of the holder.

8. The vibration device according to claim 6, wherein the light transmitter includes a first surface, a second surface on a side opposite to the first surface, and a third surface connecting the first surface and the second surface;

the holder includes a pressing surface that supports the first surface of the light transmitter and an inner side surface that faces the third surface of the light transmitter; and the first metal structure is located between the third surface of the light transmitter and the inner side surface of the holder.

9. The vibration device according to claim 8, wherein the first metal structure includes an inclined surface on a side of which the third surface of the light transmitter is located.

10. The vibration device according to claim 5, further comprising a second metal structure located, in the compressed state, between the vibrator and the holder and having a smaller Young's modulus than the vibrator and the holder.

11. The vibration device according to claim 1, further comprising an adhesive provided between the light transmitter and the support that supports the light transmitter, except a portion where the first metal structure is located.

12. The vibration device according to claim 11, wherein the support that supports the light transmitter includes at least one of a protrusion or a recess located between the adhesive and the first metal structure and is structured to separate the adhesive from the first metal structure.

13. The vibration device according to claim 11, wherein the adhesive is an epoxy-based resin.

14. The vibration device according to claim 1, wherein the first metal structure includes a metal film provided on a portion of the vibrator supporting the light transmitter.

15. An imaging device comprising:

the vibration device according to claim 1; and an imager located in the vibration device.

16. The imaging device according to claim 15, wherein the support that supports the light transmitter includes the vibrator; and the first metal structure is located between the light transmitter and the vibrator.

17. The imaging device according to claim 16, wherein the light transmitter includes a first surface and a second surface on a side opposite to the first surface;

the vibrator includes a hollow cylindrical body portion and a support portion located at one end of the body portion and including a support surface that supports the second surface of the light transmitter; and the first metal structure is located between the second surface of the light transmitter and the support surface of the support portion.

18. The imaging device according to claim 16, wherein the light transmitter includes a first surface, a second surface on a side opposite to the first surface, and a third surface connecting the first surface and the second surface;

the vibrator includes a hollow cylindrical body portion, a support portion located at one end of the body portion, and a rib protruding from the support portion in a direction in which the light transmitter is located;

the rib includes a rib inner peripheral surface that faces the third surface of the light transmitter; and the first metal structure is located between the third surface of the light transmitter and the rib inner peripheral surface of the rib.

19. The imaging device according to claim 15, further comprising a holder attached to the vibrator to press the light transmitter toward the vibrator.

20. The imaging device according to claim 19, wherein the support that supports the light transmitter includes the holder; and the first metal structure is located between the light transmitter and the holder.

* * * * *